United States Patent
Lindahl et al.

(10) Patent No.: US 10,666,920 B2
(45) Date of Patent: May 26, 2020

(54) AUDIO ALTERATION TECHNIQUES

(71) Applicant: Apple Inc., Cupertino, CA (US)

(72) Inventors: Aram Lindahl, Menlo Park, CA (US); Kelvin Chiu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 38 days.

(21) Appl. No.: 15/906,228

(22) Filed: Feb. 27, 2018

(65) Prior Publication Data
US 2018/0199020 A1    Jul. 12, 2018

Related U.S. Application Data

(63) Continuation of application No. 12/556,380, filed on Sep. 9, 2009, now Pat. No. 9,930,310.

(51) Int. Cl.
*H04N 9/806* (2006.01)
*H04N 21/81* (2011.01)
(Continued)

(52) U.S. Cl.
CPC ........... *H04N 9/8063* (2013.01); *H04N 5/602* (2013.01); *H04N 21/41407* (2013.01);
(Continued)

(58) Field of Classification Search
CPC ........... H04N 9/8063; H04N 21/41407; H04N 21/42202; H04N 21/4325; H04N 21/439;
(Continued)

(56) References Cited

U.S. PATENT DOCUMENTS

| 6,686,918 B1 | 2/2004 | Cajolet et al. |
| 7,659,896 B2 | 2/2010 | Hoddie et al. |

(Continued)

FOREIGN PATENT DOCUMENTS

| WO | 2013/152453 A1 | 10/2013 |
| WO | 2015/162072 A2 | 10/2015 |

(Continued)

OTHER PUBLICATIONS

U.S. Appl. No. 62/399,241, filed Sep. 23, 2016.
(Continued)

*Primary Examiner* — Obafemi O Sosanya
(74) *Attorney, Agent, or Firm* — Kilpatrick, Townsend & Stockton

(57) ABSTRACT

A method of altering audio output from an electronic device based on image data is provided. In one embodiment, the method includes acquiring image data and determining one or more characteristics of the image data. Such characteristics may include sharpness, brightness, motion, magnification, zoom setting, and so forth, as well as variation in any of the preceding characteristics. The method may also include producing audio output, wherein at least one characteristic of the audio output is determined based on one or more of the image data characteristics. Various audio output characteristics that may be varied based on the video data characteristics may include, for instance, pitch, reverberation, tempo, volume, filter frequency response, added sound effects, or the like. Additional methods, devices, and manufactures are also disclosed.

20 Claims, 18 Drawing Sheets

(51) Int. Cl.

| | | |
|---|---|---|
| *H04N 21/44* | (2011.01) | |
| *H04N 21/45* | (2011.01) | |
| *H04N 21/4402* | (2011.01) | |
| *H04N 21/60* | (2011.01) | |
| *H04N 21/439* | (2011.01) | |
| *H04N 21/432* | (2011.01) | |
| *H04N 5/60* | (2006.01) | |
| *H04N 21/414* | (2011.01) | |
| *H04N 21/422* | (2011.01) | |
| *H04N 21/47* | (2011.01) | |

(52) U.S. Cl.
CPC ..... *H04N 21/42202* (2013.01); *H04N 21/439* (2013.01); *H04N 21/4325* (2013.01); *H04N 21/44008* (2013.01); *H04N 21/440236* (2013.01); *H04N 21/4524* (2013.01); *H04N 21/8153* (2013.01); *H04N 21/47* (2013.01)

(58) Field of Classification Search
CPC ..... H04N 21/44008; H04N 21/440236; H04N 21/4524; H04N 21/47; H04N 21/8153; H04N 5/602
See application file for complete search history.

(56) References Cited

U.S. PATENT DOCUMENTS

| | | | |
|---|---|---|---|
| 7,669,134 | B1 | 2/2010 | Christie et al. |
| 8,249,305 | B2 | 8/2012 | Kondo |
| 8,509,458 | B2 | 8/2013 | Nakamura et al. |
| 8,648,865 | B2 | 2/2014 | Dawson et al. |
| 8,694,899 | B2 | 4/2014 | Goossens et al. |
| 8,745,152 | B2 | 6/2014 | Rapo |
| 9,684,547 | B2 | 6/2017 | Krstic et al. |
| 9,839,844 | B2 | 12/2017 | Dunstan et al. |
| 9,864,547 | B2 | 1/2018 | Ishiguro et al. |
| 9,930,310 | B2 | 3/2018 | Lindahl et al. |
| 2003/0045274 | A1 | 3/2003 | Nishitani |
| 2004/0161157 | A1 | 8/2004 | Sato et al. |
| 2004/0179037 | A1 | 9/2004 | Blattner et al. |
| 2004/0250210 | A1 | 12/2004 | Huang et al. |
| 2005/0264647 | A1 | 12/2005 | Rzeszewski et al. |
| 2006/0209076 | A1* | 9/2006 | Maeng .................. G10L 21/003 345/473 |
| 2006/0239471 | A1* | 10/2006 | Mao ........................ H04R 1/406 381/92 |
| 2007/0012167 | A1 | 1/2007 | Bang |
| 2007/0013539 | A1 | 1/2007 | Choi et al. |
| 2007/0115349 | A1 | 5/2007 | Currivan |
| 2007/0146360 | A1 | 6/2007 | Clatworthy et al. |
| 2008/0231686 | A1 | 9/2008 | Redlich |
| 2008/0240461 | A1 | 10/2008 | Nakamura |
| 2008/0279272 | A1 | 11/2008 | Saito |
| 2008/0284779 | A1 | 11/2008 | Gu et al. |
| 2008/0298705 | A1 | 12/2008 | Jeong |
| 2008/0314232 | A1 | 12/2008 | Hansson |
| 2009/0128567 | A1 | 5/2009 | Shuster et al. |
| 2009/0128657 | A1 | 5/2009 | Ozluturk |
| 2009/0212637 | A1 | 8/2009 | Baarman |
| 2009/0323984 | A1 | 12/2009 | Yuasa |
| 2010/0115022 | A1 | 5/2010 | Rapo |
| 2010/0153722 | A1 | 6/2010 | Bauchot et al. |
| 2010/0214422 | A1* | 8/2010 | Iwamura ................ H04N 5/232 348/208.4 |
| 2011/0058056 | A1 | 3/2011 | Lindahl et al. |
| 2011/0197201 | A1 | 8/2011 | Yoo et al. |
| 2011/0248992 | A1 | 10/2011 | Van Os et al. |
| 2011/0296324 | A1 | 12/2011 | Goossens et al. |
| 2012/0185542 | A1 | 7/2012 | Vyrros et al. |
| 2013/0254320 | A1 | 9/2013 | Bhalerao et al. |
| 2014/0092130 | A1 | 4/2014 | Anderson et al. |
| 2014/0154659 | A1 | 6/2014 | Otwell |
| 2014/0282000 | A1 | 9/2014 | AlMaghlough |
| 2015/0156598 | A1 | 6/2015 | Sun et al. |
| 2015/0237307 | A1 | 8/2015 | Fujii |
| 2015/0347748 | A1 | 12/2015 | Krstic et al. |
| 2015/0379752 | A1 | 12/2015 | Li |
| 2016/0006987 | A1 | 1/2016 | Li et al. |
| 2016/0042548 | A1 | 2/2016 | Du et al. |
| 2016/0110922 | A1 | 4/2016 | Haring |
| 2016/0361653 | A1 | 12/2016 | Zhang et al. |
| 2017/0069124 | A1 | 3/2017 | Tong et al. |
| 2017/0358117 | A1 | 12/2017 | Goossens et al. |
| 2018/0089880 | A1 | 3/2018 | Garrido et al. |
| 2018/0335927 | A1 | 11/2018 | Anzures |
| 2018/0336713 | A1 | 11/2018 | Avendano |
| 2018/0336716 | A1 | 11/2018 | Ramprashad |

FOREIGN PATENT DOCUMENTS

| | | |
|---|---|---|
| WO | 2015/183456 A1 | 12/2015 |
| WO | 2016/154800 A1 | 10/2016 |

OTHER PUBLICATIONS

U.S. Appl. No. 62/399,048, filed Jun. 12, 2016.
U.S. Appl. No. 62/557,121, filed Sep. 11, 2017.
U.S. Appl. No. 62/507,177, filed May 16, 2017.
U.S. Appl. No. 62/556,412, filed Sep. 9, 2017.
European Patent Application No. 17174969.0, Partial European Search Report dated Jul. 26, 2017. 13 pages.
PCT International Search Report and Written Opinion for International Application No. PCT/US2017/034340, dated Jul. 19, 2017. 10 pages.
Complete Guide—Messenger Platform—Technical Implementation, downloaded May 27, 2016, https://developers.facebook.com/docs/messenger-platform/implementation, 18 pages.
Getting Started—Messenger Platform—downloaded May 27, 2016, http://developers.facefoof.com/docs/messenger-platform/guickstart, 6 pages.
Google launches time-saving keyboard for iPhones, May 12, 2016. 2 pages.
Business Insider—Snapchat now lets you add fun stickers to photos and videos, May 23, 2016. 4 pages.
Non-Final Office Action dated Mar. 28, 2012 in U.S. Appl. No. 12/556,380. 17 pages.
Final Office Action dated Sep. 21, 2012 in U.S. Appl. No. 12/556,380. 20 pages.
Non-Final Office Action dated Jun. 7, 2013 in U.S. Appl. No. 12/556,380. 22 pages.
Final Office Action dated Dec. 17, 2013 in U.S. Appl. No. 12/556,380. 28 pages.
Non-Final Office Action dated Jul. 2, 2014 in U.S. Appl. No. 12/556,380. 30 pages.
Final Office Action dated Feb. 20, 2015 in U.S. Appl. No. 12/556,380. 33 pages.
Notice of Allowance dated Jan. 18, 2018 in U.S. Appl. No. 12/556,380. 6 pages.
Corrected Notice of Allowance dated Jan. 18, 2018 in U.S. Appl. No. 12/556,380. 13 pages.
Advisory Action dated Dec. 13, 2012 in U.S. Appl. No. 12/556,380. 2 pages.
Notice of Allowance dated Dec. 15, 2017 in U.S. Appl. No. 12/556,380. 9 pages.
Introduction—Messenger Platform, downloaded Apr. 5, 2019, https://developers.facebook.com/docs/messenger-platform/introduction. 3 pages.
"YouTube." https://www.youtube.com/watch?v=ma1eyZUCwLQ. (Sep. 17, 2019 in U.S. Appl. No. 15/908,603.). o.
Valenti, Roberto et al., "Sonify Your Face: Facial Expressions for Sound Generation." MM'10, Oct. 25-29, 2010, Firenze, Italy.

* cited by examiner

AUDIO ALTERATION TECHNIQUES

CROSS-REFERENCE TO RELATED APPLICATIONS

The present application claims priority from and is a continuation of U.S. patent application Ser. No. 12/556,380, entitled "Audio Alteration Techniques" filed Sep. 9, 2009, the entire contents of which are herein incorporated by reference for all purposes.

BACKGROUND

The present disclosure relates generally to altering audio signals for playback on a device and, more particularly, to techniques for altering audio based on image data and other non-audio data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, the growing popularity of digital media has created a demand for digital media player devices, which may be portable or non-portable. Further, convergence of electronic devices has resulted in the combination of an increasing number of functionalities into single electronic devices. For example, whereas cell phones, media players, personal organizers, cameras, and gaming systems were once provided only as separate electronic systems with their own unique capabilities, it is now possible to use a single device to make telephone calls, play audio and/or video media, maintain contact information, capture images, and play electronic games, among other functionalities.

With respect to media playback, some electronic devices provide for playback of audio data, video data, or both to a user. For example, music or other audio files may be stored on an electronic device and may be output to a user on demand. Further, electronic devices may also storage and reproduction of image files, such as photographs, slideshows, and video images. While such audio files and image files may be transferred to the electronic device from some other device or the Internet, they may also or instead by acquired directly by the electronic device. For instance, the electronic device may include a microphone and a camera, allowing a user to capture audio and image data (e.g., still images and video images). In addition to media playback, electronic devices may also output audio associated with games, telephone calls, system operation, and the like.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for altering audio based on non-audio data. For example, in certain disclosed embodiments, an electronic device may alter an audio output based on image characteristics of processed image data, such as characteristics identified by an image signal processor or a video encoder. Various audio effects may be applied to alter an audio stream based on the image characteristics. In certain embodiments, these audio effects may include variation of one or more of pitch, tempo, frequency range, volume, reverb, or timbre based on the image characteristics. In other embodiments, audio output may be altered based also or instead on motion data, position data, or the like.

Various refinements of the features noted above may exist in relation to the presently disclosed embodiments. Additional features may also be incorporated in these various embodiments as well. These refinements and additional features may exist individually or in any combination. For instance, various features discussed below in relation to one or more of the illustrated embodiments may be incorporated into any of the above-described embodiments alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which.

DETAILED DESCRIPTION

Figure 1:
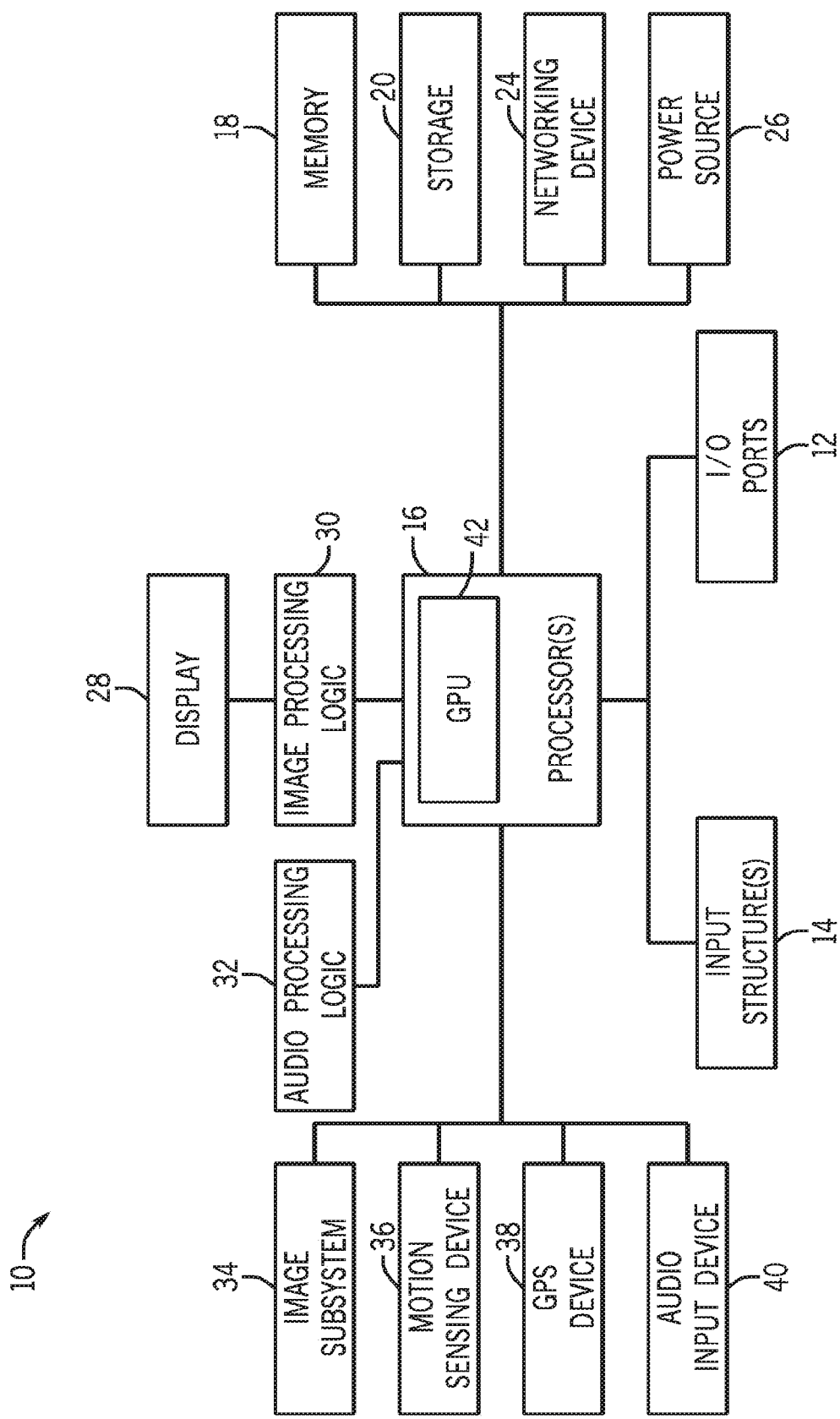
FIG. 1 is a block diagram depicting components of an electronic device configured that may provide audio alteration functionalities in accordance with aspects of the present disclosure.

One or more specific embodiments are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As noted above, the present application is generally directed to techniques for altering an audio signal based on non-audio data, such as image data. In some embodiments, image data may be processed by an image signal processor, and various image characteristics or metrics, such as brightness, sharpness, and color statistics, may be provided to audio processing logic. Further, in some embodiments, image data may be encoded by a video encoder, which may provide additional image characteristics or metrics to the audio processing logic. Such additional image characteristics may be related to the encoding process, and may include, for example, motion vectors calculated by the encoder and encoding prediction errors.

The audio processing logic may then alter audio based on one or more of the received image characteristics. For example, the altering of audio by the audio processing logic may include generating a synthesized sound, varying aspects of the synthesized sound, and/or varying aspects of other audio data, such as that provided via an audio input device or stored in a memory. Aspects of the audio that may be varied include pitch, tempo, frequency response, equalization levels, volume, various additional processing effects, and so forth. In additional embodiments, audio may also or instead be altered by an electronic device based on motion of the device or location data.

With these foregoing features in mind, a general description of electronic devices that may provide such audio alteration functionality is provided below. By way of example, FIG. 1 is a block diagram illustrating an electronic device, referred to by reference number 10, which may be configured to implement the above-discussed audio alteration techniques, in accordance with one embodiment of the present disclosure. Electronic device 10 may be any type of electronic device that includes capabilities for processing audio data and/or image data, which may include still images (e.g., pictures) or moving images (e.g., video). For instance, electronic device 10 may be a portable media player, a mobile phone, a laptop computer, a desktop computer, or the like. By way of example only, electronic device 10 may be a portable electronic device, such as a model of an iPod® or iPhone® available from Apple Inc. of Cupertino, Calif. In another embodiment, electronic device 10 may be a desktop or laptop computer, including a MacBook®, MacBook® Pro, MacBook Air®, iMac®, Mac® Mini, or Mac Pro®, also available from Apple Inc. In further embodiments, electronic device 10 may be a model of an electronic device from another manufacturer that is capable of processing image and/or audio data. As will be discussed further below, electronic device 10 may include circuitry or logic (e.g., audio processing logic 32) configured to process audio data in response to one or more device operation events, which may include image-related events, motion-related events, or location-related events, to name just a few.

As shown in FIG. 1, electronic device 10 may include various internal and/or external components which contribute to the function of device 10. Those of ordinary skill in the art will appreciate that the various functional blocks shown in FIG. 1 may include hardware elements (including circuitry), software elements (including computer code stored on a computer-readable medium) or a combination of both hardware and software elements. It should further be noted that FIG. 1 is merely one example of a particular implementation and is intended to illustrate the types of components that may be present in electronic device 10. For example, in the presently illustrated embodiment, these components may include input/output (1/0) ports 12, input structures 14, one or more processors 16, memory device 18, non-volatile storage 20, networking device 24, power source 26, display 28, image processing logic 30, and audio processing logic 32. Electronic device 10 may additionally include imaging subsystem 34, motion sensing device 36, positioning device 38, and audio input device 40 (e.g., a microphone), all of which may facilitate alteration of audio data in accordance with the presently disclosed techniques.

With regard to each of the illustrated components, I/O ports 12 may include ports configured to connect to a variety of external devices, such as headphones, or other electronic devices, such as computers, printers, projectors, external displays, modems, docking stations, and so forth. I/O ports 12 may support any interface type, such as a universal serial bus (USB) port, an IEEE-1394 port, and/or an AC/DC power connection port. In one embodiment, I/O ports 12 may include a proprietary port from Apple Inc. that may function to charge power source 26 (which may include one or more rechargeable batteries) of device 10, or transfer data between device 10 and an external source.

Input structures 14 may provide user input or feedback to processor(s) 16. For instance, input structures 14 may be configured to control one or more functions of electronic device 10, applications running on electronic device 10, and/or any interfaces or devices connected to or used by electronic device 10. By way of example only, input structures 14 may include buttons, sliders, switches, control pads, keys, knobs, scroll wheels, keyboards, mice, touchpads, and so forth, or some combination thereof. In one embodiment, input structures 14 may allow a user to navigate a graphical user interface (GUI) displayed on display 28. Further, in certain embodiments, input structures 14 may include a touch sensitive mechanism provided in conjunction with display 28. In such embodiments, a user may select or interact with displayed interface elements via the touch sensitive mechanism.

Processor(s) 16 may include one or more microprocessors, such as one or more "general-purpose" microprocessors, one or more application- specific processors (ASICs), or a combination of such processing components, which may control the general operation of electronic device 10. For example, processor(s) 16 may include one or more instruction set processors (e.g., RISC), graphics processors, audio processors and/or other related chipsets. In the illustrated embodiment, processor(s) 16 may include graphics processing unit (GPU) 42, which may operate in conjunction with image processing logic 30 to output image data to display 28.

Programs or instructions executed by processor(s) 16 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by processor(s) 16 to enable device 10 to provide various functionalities, including those described herein.

For example, instructions or data to be processed by processor(s) 16 may be stored in memory 18, which may include a volatile memory, such as random access memory (RAM); a non-volatile memory, such as read-only memory (ROM); or a combination of RAM and ROM devices. Memory 18 may store firmware for electronic device 10, such as a basic input/output system (BIOS), an operating system, various programs, applications, or any other routines that may be executed on electronic device 10, including user interface functions, processor functions, image acquisition functions, audio alteration functions, media playback functions, and so forth. In addition, memory 18 may include one or more frame buffers for buffering or caching image data.

The illustrated components may further include other forms of computer-readable media, such as non-volatile storage device 20, which may be utilized for persistent storage of data and/or instructions. Non-volatile storage 20 may include flash memory, a hard drive, or any other optical, magnetic, and/or solid-state storage media. By way of example, non-volatile storage 20 may be used to store data files, such as image data and audio data. For instance, in some embodiments, the image data that is processed by image processing logic 30 prior to being output to display 28 may be a still image file (e.g., picture) or a video file stored in storage device 20.

The components depicted in FIG. 1 further include network device 24, which may be a network controller or a network interface card (NIC). For example, network device 24 may provide for network connectivity over any wireless 802.11 standard or any other suitable networking standard, such as a local area network (LAN), a wide area network (WAN), such as an Enhanced Data Rates for GSM Evolution (EDGE) network or a 3G data network (e.g., based on the IMT-2000 standard), or the Internet. In certain embodiments, network device 24 may provide for a connection to an online digital media content provider, such as the iTunes® service, available from Apple Inc., through which a user may access, stream, or download digital audio or video to electronic device 10, which may then be played back and processed in accordance with the present techniques.

Display 28 may be used to display image data, which may include stored image data (e.g., picture or video files stored in storage device 20), streamed image data (e.g., from network device 24), as well as live captured image data (e.g., via imaging subsystem 34). Additionally, display 28 may display various images generated by the device 10, including a GUI for an operating system or other application. Display 28 may be any suitable display such as a liquid crystal display (LCD), plasma display, or an organic light emitting diode (OLEO) display, for example. In one embodiment, display 28 may be provided in conjunction with a touch screen that may function as part of a control interface for device 10.

As mentioned above, electronic device 10 may include image processing logic 30 and audio processing logic 32, which may be configured to process image data and audio data, respectively. Such image and audio data may be captured by electronic device 10 (e.g., by a camera and microphone of electronic device 10), or may be received from another source and stored in electronic device 10. In various embodiments, audio processing logic 32 provides for the alteration of audio data that is to be output to a user via electronic device 10. As will be discussed in greater detail below, such audio alteration may be based on image data (which may be acquired via imaging subsystem 34 or in some other manner), motion events (e.g., provided via motion sensing device 36), location events (e.g., provided via positioning device 38), or some combination thereof.

Imaging subsystem 34 may be configured to capture still or moving images. For instance, imaging subsystem 34 may include one or more image capture devices, such as cameras having one or more image sensors. Imaging subsystem 34 may also include an image signal processor (ISP), which may be part of processor(s) 16. As will be appreciated, the ISP may process data acquired via the image sensors to generate a digital representation of the captured data, which may be displayed and/or stored on device 10. As will be discussed further below, in some embodiments, alteration of audio to be output to a user may be based on image characteristics (e.g., brightness level, sharpness level, color statistics, etc.) from imaging subsystem 34.

Motion sensing device 36 may be any device configured to measure motion or acceleration experienced by device 10, such as an accelerometer or a gyroscope. In one embodiment, motion sensing device 36 may be a three-axis accelerometer that includes a sensing element and an integrated circuit interface for providing the measured acceleration and/or motion data to processor(s) 16. Motion sensing device 36 may be configured to sense and measure various types of motion including, but not limited to, velocity, acceleration, rotation, and direction, any or all of which may be used as a basis for altering audio output by electronic device 10.

Electronic device 10 also includes positioning device 38. By way of example, positioning device 38 may be a GPS system, such as an Assisted GPS (A-GPS) system. Positioning device 38 may be configured to determine the geographic coordinates of device 10. Additionally, positioning device 38 may further determine course and velocity parameters from variation in the geographic coordinates. In one embodiment, audio processing logic 32 may alter audio output based on such data from positioning device 38.

Additionally, electronic device 10 includes audio input device 40, which may be configured to receive audio signals. In one embodiment, audio input device 40 may include one or more audio receivers, such as microphones. Audio received via audio input device 40 may be stored in device 10, and may be altered in accordance with the present techniques.

Figure 2:
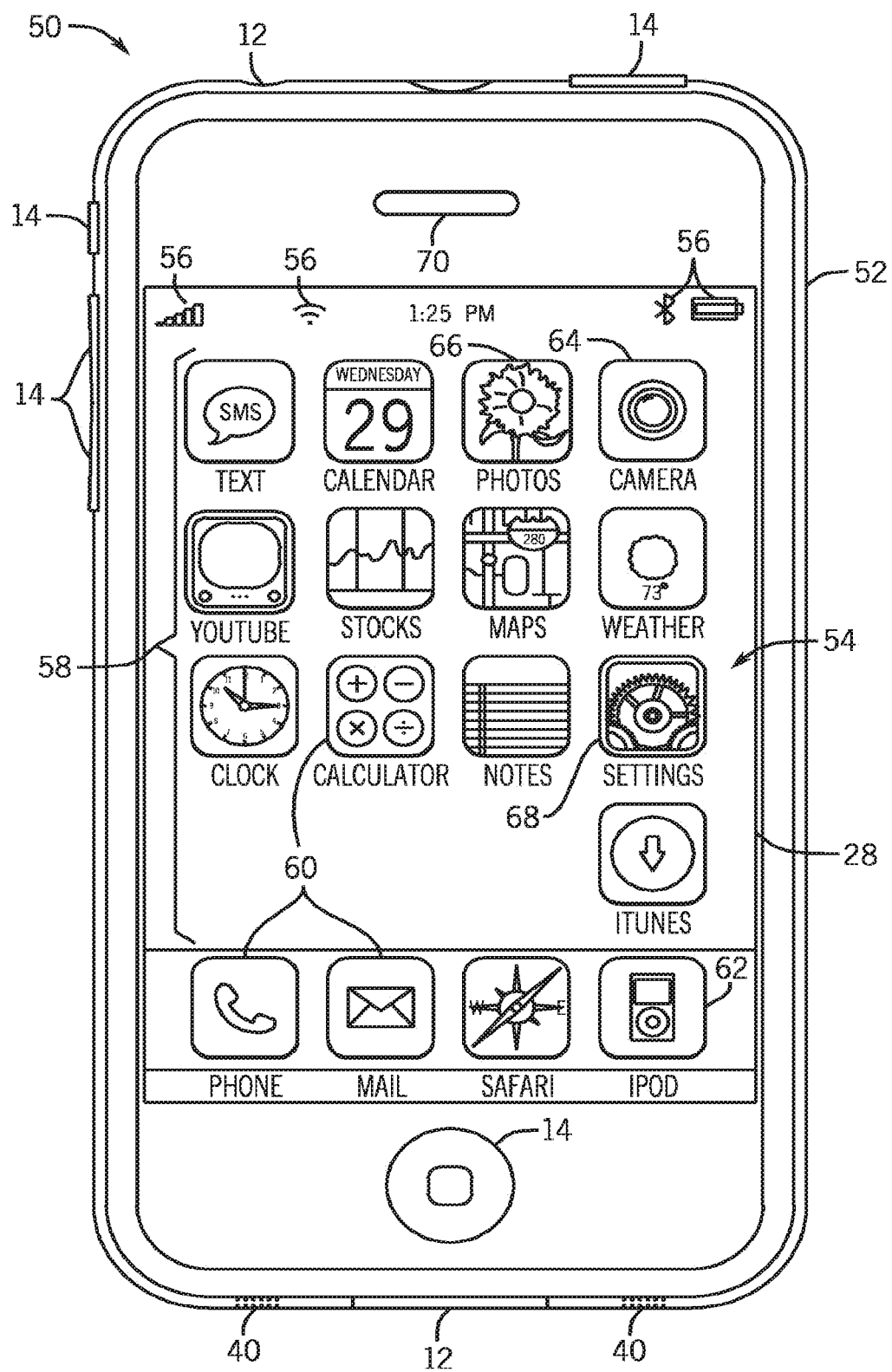
FIG. 2 is a front view of a handheld electronic device in accordance with aspects of the present disclosure.

Referring now to FIG. 2, electronic device 10 is illustrated in the form of portable handheld electronic device 50, which may be a model of an iPod® or iPhone® available from Apple Inc. It should be understood that while the illustrated handheld device 50 is generally described in the context of portable digital media player and/or cellular phone, additional embodiments of handheld device 50 may incorporate additional functionalities, such as a camera, a portable gaming platform, a personal data organizer, or some combination thereof. Thus, depending on the functionalities provided by handheld electronic device 50, a user may listen to music, play video games, take pictures, and place telephone calls, while moving freely with handheld device 50.

In the depicted embodiment, handheld device 50 includes enclosure 52, which may function to protect the interior components from physical damage and shield them from electromagnetic interference. Enclosure 52 may be formed from any suitable material or combination of materials, such as plastic, metal, or a composite material, and may allow certain frequencies of electromagnetic radiation to pass through to wireless communication circuitry (e.g., network device 24) within device 50.

As shown in the present embodiment, enclosure 52 includes user input structures 14 through which a user may interface with handheld device 50. For instance, each input structure 14 may be configured to control one or more respective device functions when pressed or actuated. By way of example, one or more of input structures 14 may be configured to invoke a "home" screen 54 or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that handheld device 50 may include any number of suitable user input structures existing in various forms including buttons, switches, keys, knobs, scroll wheels, and so forth.

In the illustrated embodiment, display 28 may be provided in the form of a liquid crystal display (LCD), which may display various images generated by handheld device 50. For example, LCD 28 may display various system indicators 56 providing feedback to a user with regard to one or more states of handheld device 50, such as power status, signal strength, external device connections, and so forth. LCD 28 may also display graphical user interface (GUI) 58 that may allow a user to interact with handheld device 50. GUI 58 may include various layers, windows, screens, templates, or other graphical elements that may be displayed in all, or a portion, of LCD 28. For instance, as shown on home screen 54, GUI 58 may include graphical elements representing applications and functions of device 50.

The graphical elements may include icons 60, each of which may correspond to various applications that may be opened or executed upon detecting a user selection of a respective icon 60. By way of example, one of the icons 60 may represent media player application 62, which may provide for the playback of digital audio and video data stored on device 50, as well as the playback of streamed video data. Another icon 60 may represent camera application 64, which may provide for the capture of still or moving images by a camera which, in one embodiment, may be integrated with handheld device 50. Additionally, one of the icons 60 may also represent a photo browser application 66, by which a user may view images stored on handheld device 50, some of which may have been acquired using camera application 64. Further, one of the icons 60 may represent an application 68 through which a user may set various user preferences for controlling the alteration of audio data based upon image data, motion data, position data, and the like. In some embodiments, the selection of an icon 60 may lead to a hierarchical navigation process, such that selection of an icon 60 leads to a screen that includes one or more additional icons or other GUI elements. As will be appreciated, icons 60 may be selected via a touch screen included in display 28, or may be selected using one of user input structures 14.

As shown, electronic device 50 may include audio input devices 40, which may be provided as one or more microphones. In embodiments where device 50 includes cell phone functionality, audio input devices 40 may be configured to receive user audio input, such as a user's voice. In some embodiments, audio input devices 40 may also be integrated with audio output devices, such as speakers, for transmitting audio signals to a user, such as during playback of music data, for example. Further, where electronic device 50 includes a cell phone application, an additional audio output transmitter 70 may be provided, as shown in FIG. 2. Output transmitter 70 may also include one or more speakers configured to transmit audio signals to a user, such as voice data received during a telephone call. Thus, audio input devices 40 and output transmitter 70 may operate in conjunction to function as the audio receiving and transmitting elements of a telephone.

Figure 3:
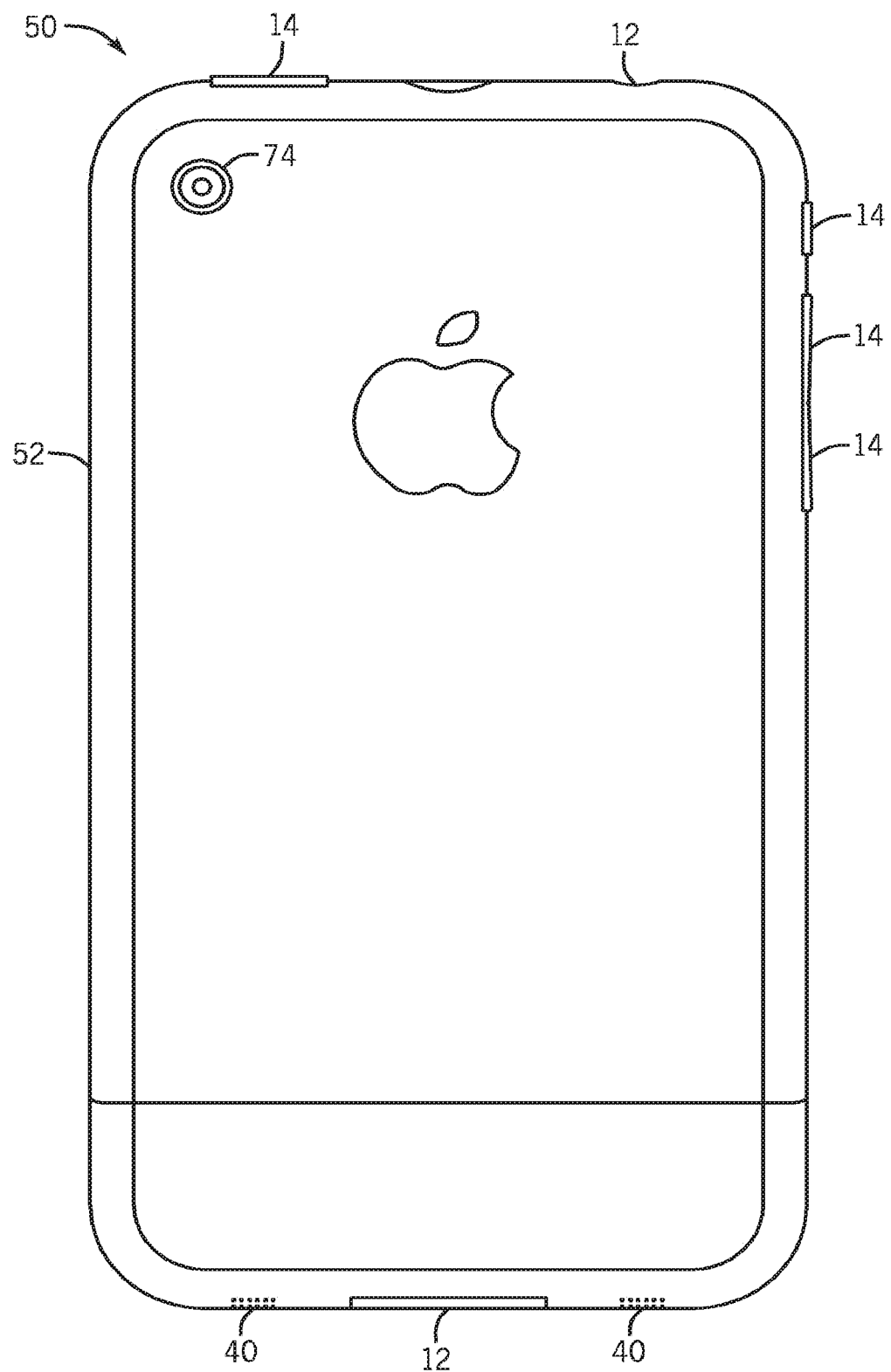
FIG. 3 is a rear view of the handheld electronic device of FIG. 2 in accordance with aspects of the present disclosure.

Referring briefly to FIG. 3, a rear view of handheld electronic device 50 is illustrated. As shown in FIG. 3, device 50 may include camera 74, which may be used in conjunction with camera application 64 to acquire still or moving images, such as digital photographs or videos. Images acquired via camera 74, and audio associated with the images and acquired via audio input devices 40, may be stored on device 50. The acquired audio may be subsequently processed by audio processing logic 32 for the addition of one or more audio alteration effects. Additionally, a user may also have the option of configuring device 50 such that audio processing logic 32 applies an audio alteration effect to the captured audio during video capture, whereby the captured audio or a synthesized audio output is altered based on the images captured by camera 74 as the images are displayed on display 28 (e.g., in substantially real time) and/or being written to storage device 20.

As noted above, electronic device 10 may also take the form of a computer system or some other type of electronic device. Such computers may include computers that are generally portable (such as laptop, notebook, tablet, and handheld computers), as well as computers that are generally used in one place (such as conventional desktop computers, workstations and/or servers). As previously noted, in certain embodiments electronic device 10 in the form of a computer may be a model of a MacBook®, MacBook® Pro, MacBook Air®, iMac®, Mac® mini, or Mac Pro® available from Apple Inc.

Figure 4:
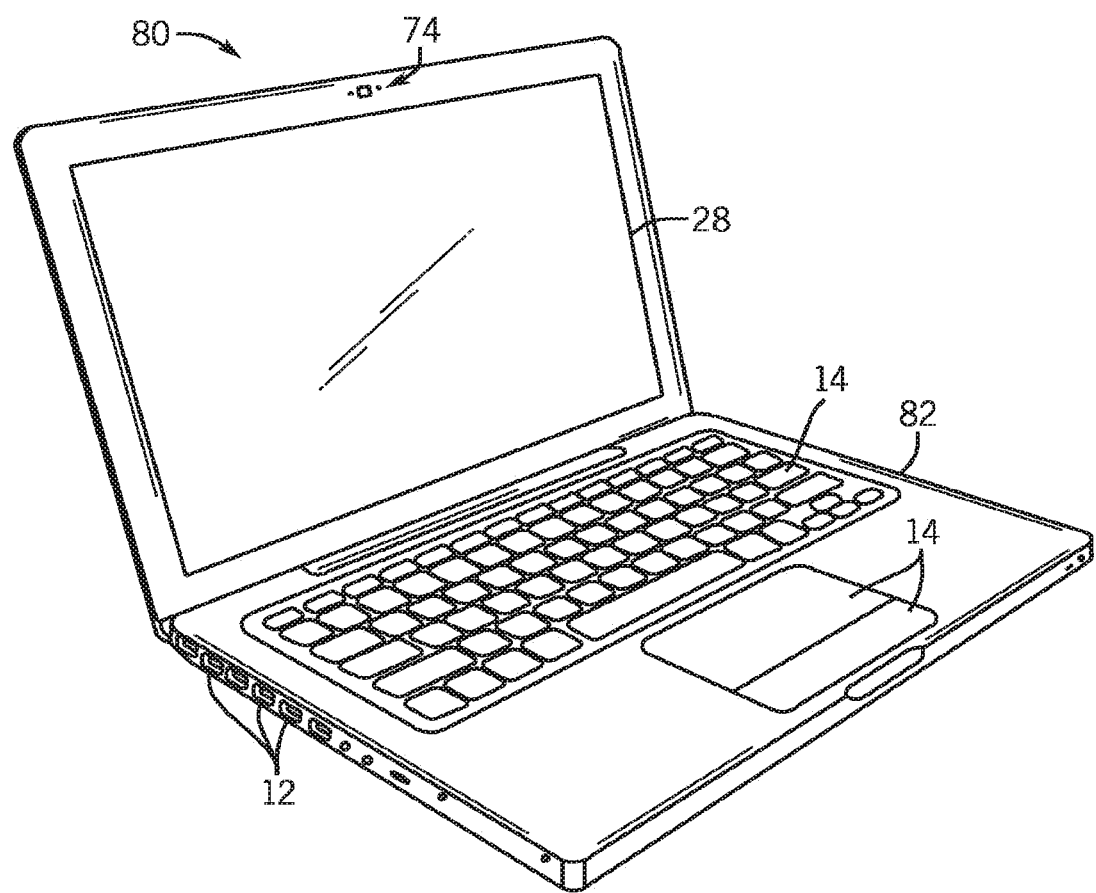
FIG. 4 is a perspective view of an electronic device of FIG. 1 in the form of a computer in accordance with aspects of the present disclosure.

By way of example, electronic device 10 in the form of laptop computer 80 is illustrated in FIG. 4 in accordance with one embodiment. Depicted computer 80 includes housing 82, display 28 (e.g., an LCD or some other suitable display), input/output ports 12, and input structures 14. In one embodiment, input structures 14 may include a keyboard and a touchpad mouse that are integrated with housing 82. Additionally, input structures 14 may include various other buttons and/or switches which may be used to interact with computer 80, such as to power on or start the computer, to operate a GUI or an application running on computer 80, as well as adjust various other aspects relating to operation of computer 80 (e.g., sound volume, display brightness, etc.).

As depicted, electronic device 10 in the form of computer 80 may also include various 1/0 ports 12 to provide connectivity to additional devices. For example, 1/0 ports 12 may include a USB port, a DVI port, or some other port suitable for connecting to another electronic device, a projector, a supplemental display, and so forth. In addition, computer 80 may include network connectivity, memory, and storage capabilities, as described with respect to FIG. 1. As a result, computer 80 may store and execute a GUI and other applications, such as one or more applications configured to implement the audio alteration techniques described herein.

Further, as depicted in FIG. 4, computer 80 includes integrated camera 74. In other embodiments, computer 80 may instead or also utilize one or more external cameras 74 (e.g., external USB cameras or "webcams") connected to one or more of 1/0 ports 12. For instance, an external camera may be an iSight® camera available from Apple Inc. Camera 74, whether integrated or external, may provide for the capture and recording of images. Such images may then be viewed by a user using an image viewing application, or may be utilized by other applications, including videoconferencing applications, such as iChat®, and image editing applications, such as Photo Booth®, both of which are available from Apple Inc. Additionally, in accordance with some embodiments, computer 80 may alter audio to be output to a user based on the image data captured by camera 74.

Figure 5:
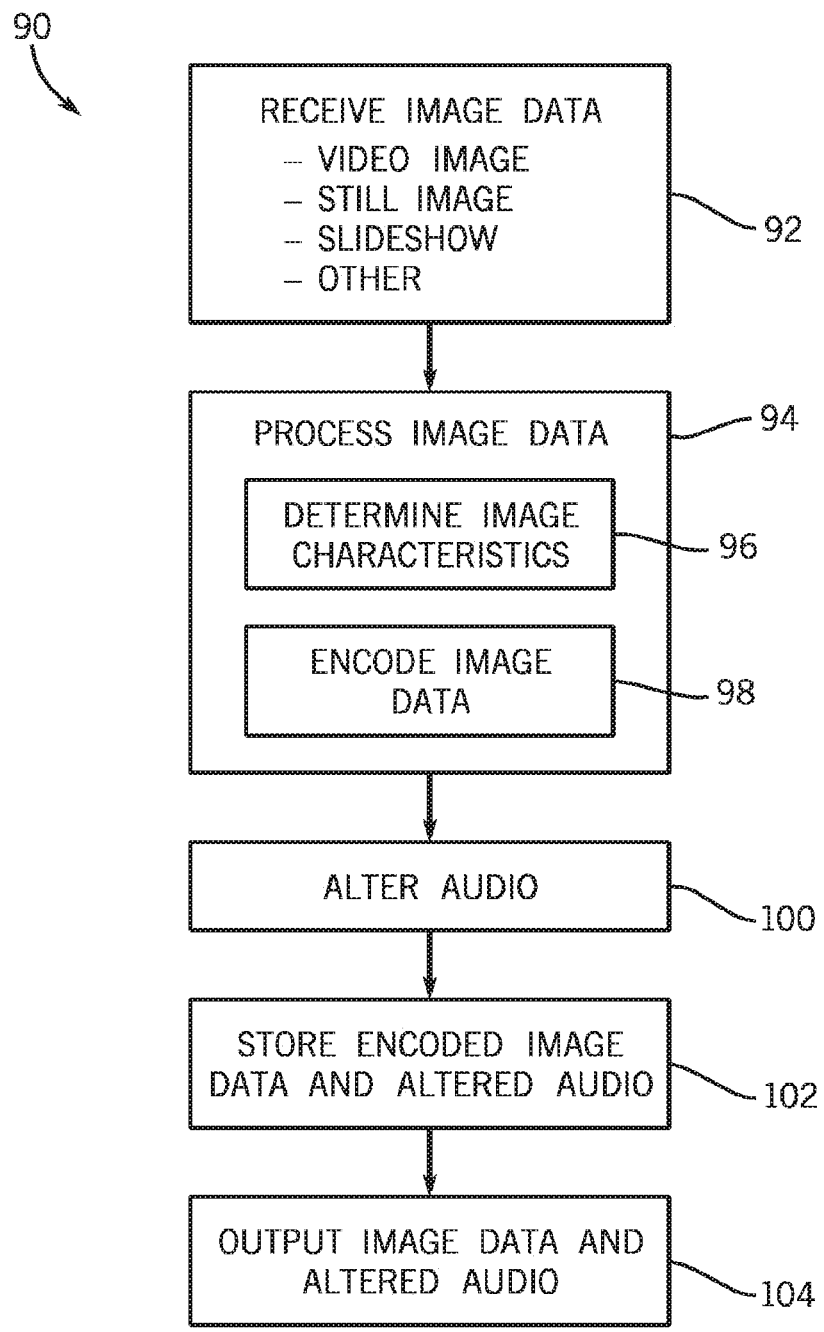
FIG. 5 is a flowchart generally depicting a method for altering audio based on one or more image characteristics in accordance with aspects of the present disclosure.

As noted above, electronic device 10 may alter audio to be played back to a user based on image data. Accordingly, method 90 for altering audio based on such image data is generally depicted in FIG. 5 in accordance with one embodiment. In the presently illustrated embodiment, method 90 includes receiving image data in step 92. The received image data may include video image data, still image data, slideshow data (e.g., data for a sequence of still images), or the like. Additionally, the received image data may include raw image data acquired via camera 74, image data acquired from another image acquisition device, or image data from some other source (e.g., data stored in electronic device 10 or downloaded from another electronic device).

The received image data may be processed in step 94. Such processing may include determining image characteristics from the image data in step 96. Such processing may be performed via image processing logic 30, imaging subsystem 34, or some other component of electronic device 10, and the determined image characteristics may include various parameters determined from the image data. Additionally, in one embodiment, the processing of image data in step 94 may also include encoding the image in step 98. In such an embodiment, the image characteristics determined in step 96 may further include data pertaining to the encoding process. In various embodiments, examples of such image characteristics may include, among others, image sharpness data, image brightness data, image color data, motion vectors calculated by a video encoder, prediction errors calculated by such an encoder, and frame characteristic data for encoded video frames.

In step 100, an audio file or output may be altered based on the image characteristics determined in step 96. The encoded image data, the altered audio, or both may be stored in any suitable storage device (e.g., non-volatile storage 20) in step 102, thereby allowing future playback of the audio and images. Further, the image data and/or the altered audio may be output from electronic device 10 in step 104, such as to a user via one or more speakers or to an additional electronic device 10.

Figure 6:
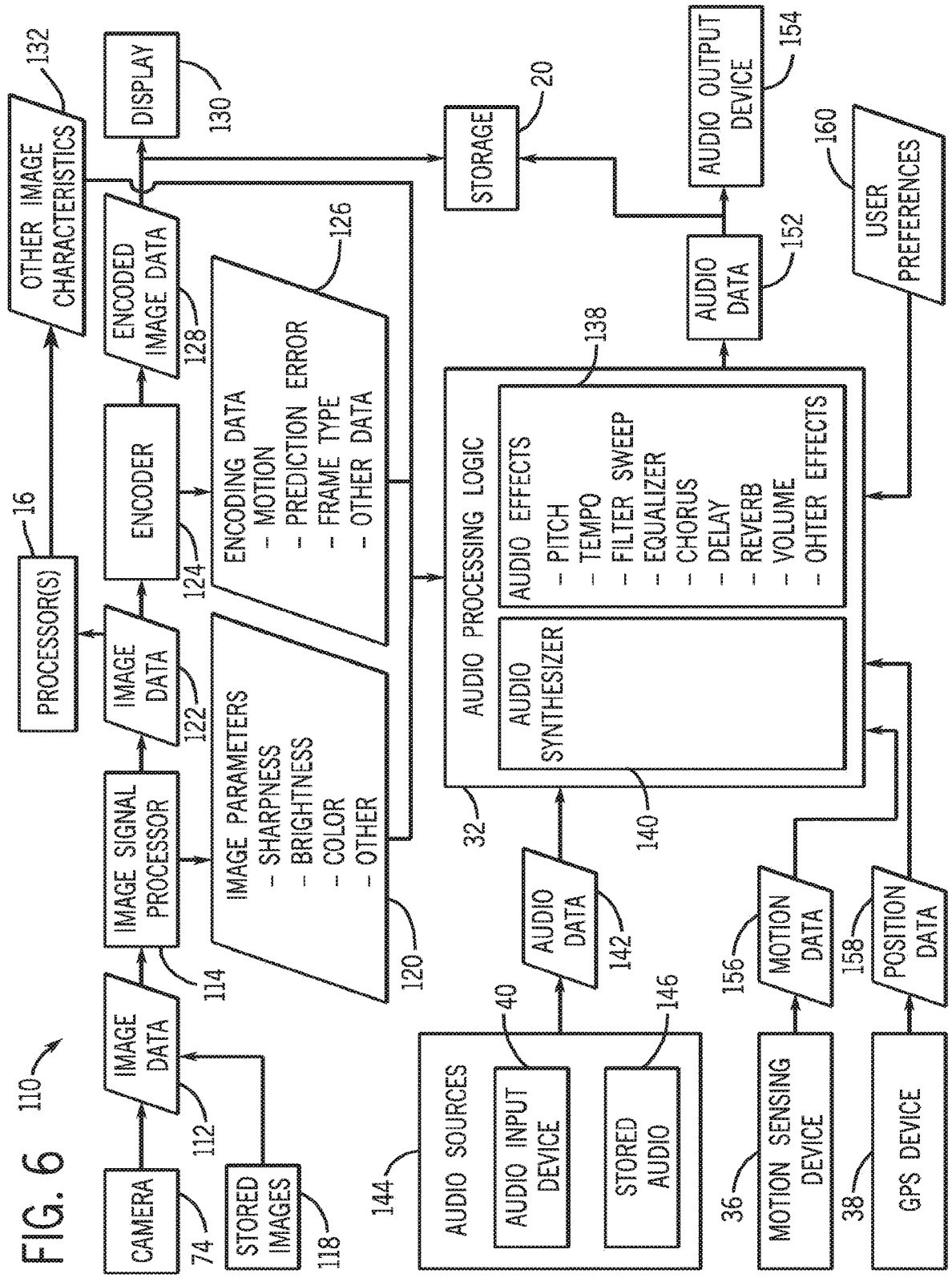
FIG. 6 is a block diagram depicting the processing of image data and the alteration of an audio signal by components of an electronic device in accordance with aspects of the present disclosure.

By way of further example, a block diagram generally depicting alteration of audio based on image characteristics, motion data, and position data is provided in FIG. 6 in accordance with one embodiment. As generally depicted in block diagram 110, image data 112 may be input to image signal processor (ISP) 114. In one embodiment, such image data 112 may be received from an image acquisition device, such as camera 74. In other embodiments, however, image data 112 may also or instead be received by ISP 114 from images 118 stored in some suitable medium, such as non-volatile storage 20. ISP 114 and camera 74 may be included together as components of image subsystem 34, though in other embodiments ISP 114 may be provided separately from camera 74, such as a component of image processing logic 30. ISP 114 may process received image data 112 to determine various image parameters 120. For example, in one embodiment, ISP 114 may be employed to determine various image characteristics, such as brightness, sharpness, color palette information, or other image data.

Processed image data 122 may be output by ISP 114 for further processing by encoder 124, which may encode and/or compress image data 122. Encoder 124 may be any suitable encoder, such as an H.264 encoder, some other H.26x encoder, or some form of MPEG encoder, to name but a few. Further, encoder 124 may provide additional image characteristic data, such as in the form of encoding data 126. Encoding data 126 may include, among other forms of data, motion data (e.g., motion vectors calculated by encoder 124 for blocks of pixels in image data 122), prediction errors (e.g., the amount by which predicted motion of blocks of pixels across multiple frames deviates from the actual motion of such pixels across the frames), and various data pertaining to frame type (e.g., whether an encoded frame is a key image frame). Encoded image data 128 may then be output to display 28, may be stored in non-volatile storage 20, or both. As will be appreciated, encoded image data 128 stored in non-volatile storage 20 may be played back to a user via display 28 at a future time.

Image data (e.g., data 122) may also or instead be provided to one or more processors 16, such as a central processing unit (CPU), a graphics processing unit (e.g., GPU 42), or some other processor. In one embodiment, processor(s) 16 may receive image data 122 and analyze such image data via software. For instance, in one embodiment, the image data 122 may be analyzed by processor(s) 16 in accordance with an image analysis routine to detect one or more particular image features or characteristics 132 of image data 122.

Various image characteristics determined from the processing of image data (e.g., image parameters 120, encoding data 126, and other image characteristics 132) may be input to audio processing logic 32. While such image characteristics are generally depicted as being input to audio processing logic 32 directly from ISP 114, encoder 124, and processor(s) 16, it is noted that such image characteristics may be stored in a suitable storage medium (e.g., storage 20) and input to audio processing logic 32 at some future time (such as during output of image data from storage 20). In the presently depicted embodiment, audio processing logic 32 may apply various audio effects 138 based on the received image characteristics. Such audio effects may include variations in one or more characteristics of an audio signal. For example, effects 138 applied to audio may include variation in pitch; variation in tempo; a change in frequency response (e.g., filter sweep); alteration of equalization characteristics; application of a chorus effect, a delay effect, a reverb effect, or the like; alteration of the volume of the audio; the addition of a synthesized sound effect; or other desired audio effects.

In one embodiment, audio processing logic 32 includes audio synthesizer 140 for creating audio to be output to a user, and such audio effects 138 may be applied to audio synthesized via synthesizer 140. For example, audio synthesizer 140 may generate a sound, and the characteristics of the sound may be varied as generally disclosed herein based on the determined image characteristics. Additionally, audio effects 138 may also or instead be applied to audio data 142 received from other audio sources 144, such as audio input device 40 (e.g., a microphone) or various audio files 146 stored in a suitable storage medium (e.g., storage 20). Altered audio data 152 may then be output via audio output device 154 (e.g., one or more speakers) and/or may be stored in non-volatile storage 20 or some other suitable storage medium for later playback or transfer to another electronic device 10.

In some embodiments, audio effects 138 may also or instead be generated based on motion data 156 from motion sensing device 36, and/or position data 158 received from GPS (or other positioning) device 38. Moreover, various aspects of the audio effect generation may be modified or selected in accordance with various user preferences 160. In one embodiment, the user may enter application 68, or some other settings application, to set preferences for aspects of the audio alteration techniques described herein. For example, a user may set the magnitude of variation of an audio signal; the particular effects applied in response to particular forms of image data, motion data, or position data; various characteristics of audio synthesized via synthesizer 140; and the like.

Figure 7:
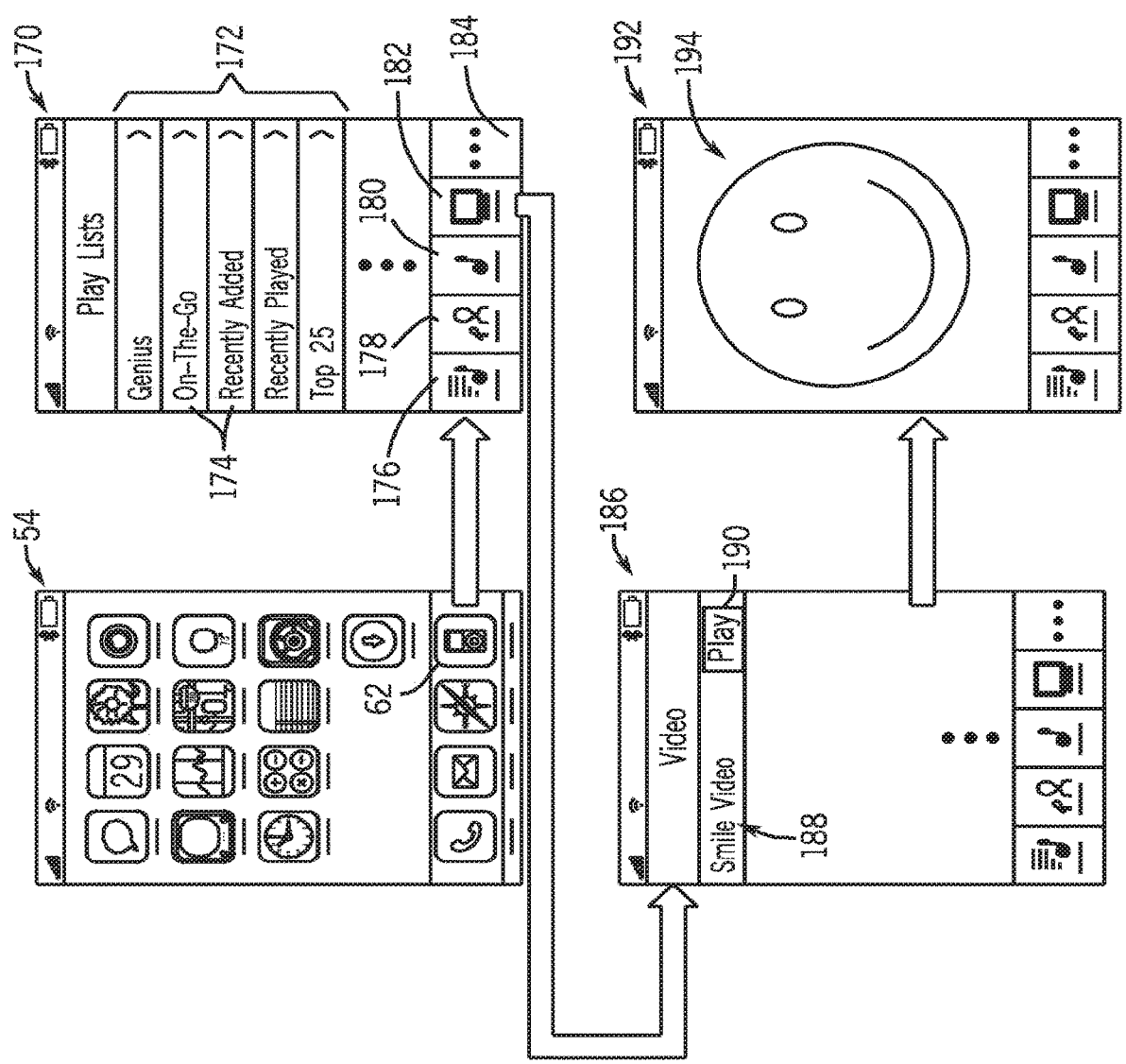
FIG. 7 depicts a plurality of screens that may be displayed on the electronic device of FIG. 2 during execution of a media player application that provides for video playback functions in accordance with aspects of the present disclosure.
Figure 8:
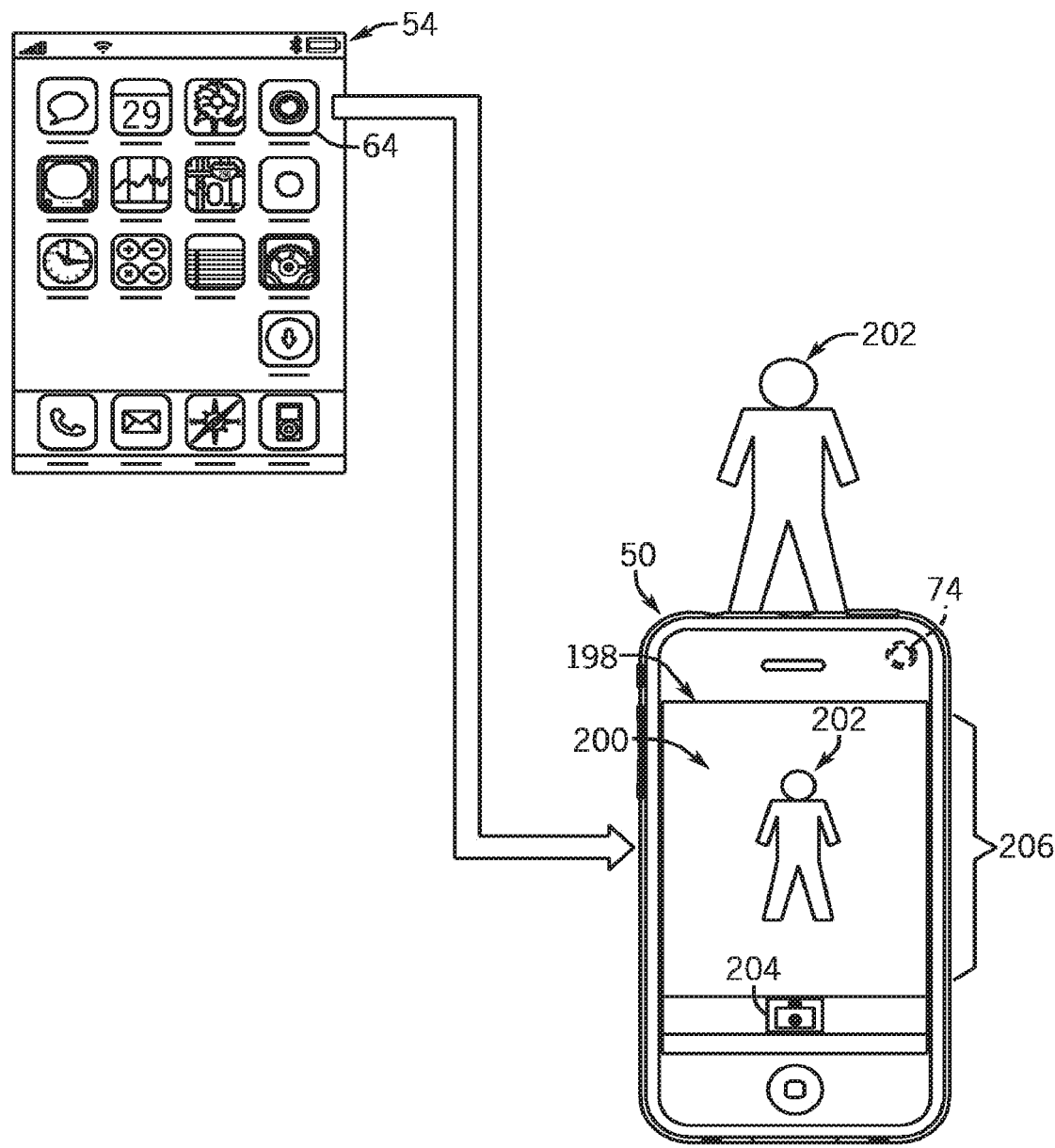
FIG. 8 depicts a plurality of screens that may be displayed on the electronic device of FIG. 2 during execution of an imaging application that may be utilized for acquiring live image data in accordance with aspects of the present disclosure.
Figure 9:
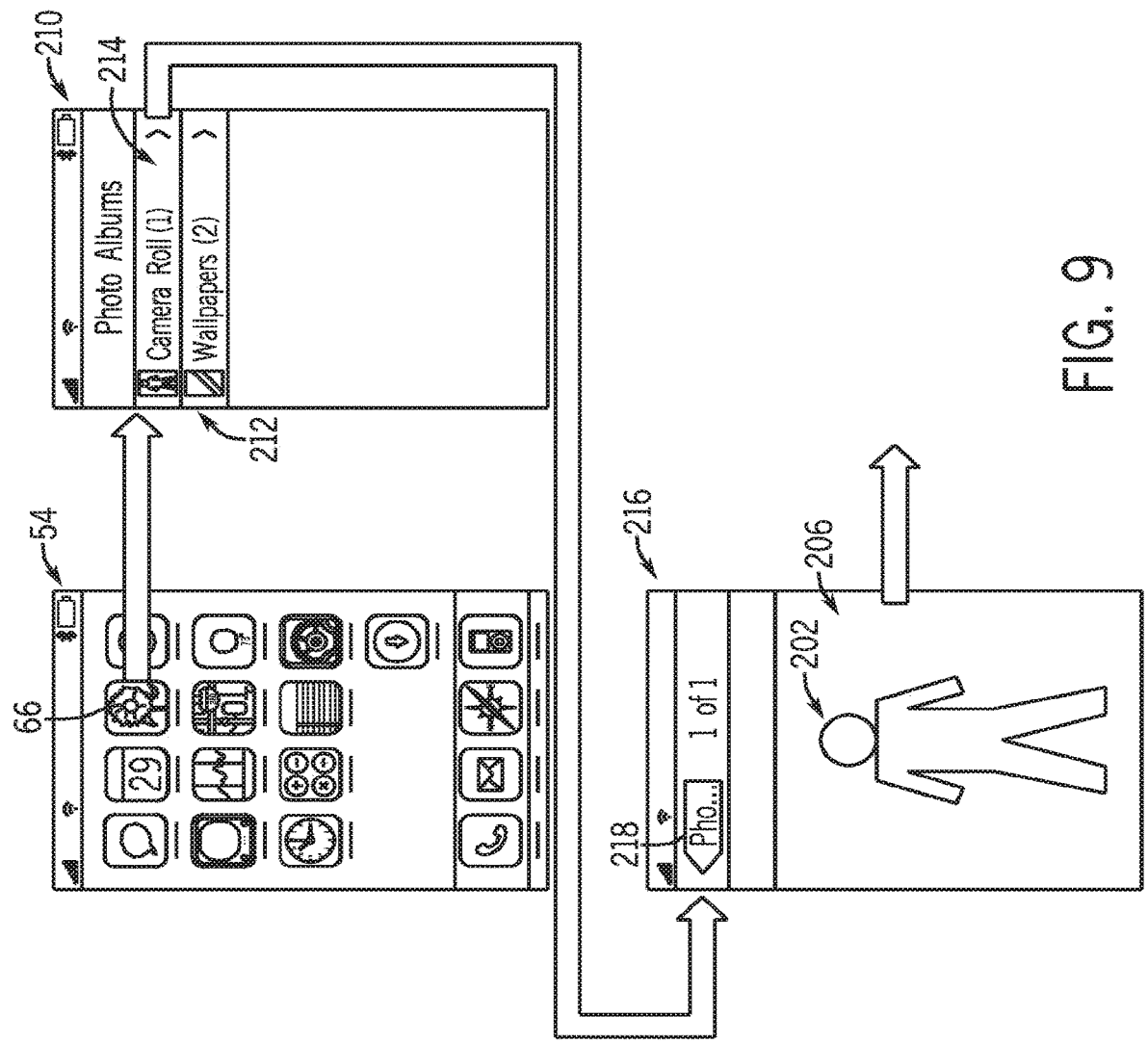
FIG. 9 depicts a plurality of screens that may be displayed on the electronic device of FIG. 2 during execution of an image viewing application that may be utilized for viewing images stored on the device of FIG. 2 in accordance with aspects of the present disclosure.

With the above points in mind, various techniques for acquiring, viewing, or playing back still and moving image data using handheld device 50 are illustrated in FIGS. 7-9 by way of multiple screen images that may be displayed on display 28. Particularly, FIG. 7 depicts the playback of a video file using media player application 62, FIG. 8 depicts the live capture of image data (e.g., still images or video images) using camera 74 and camera application 64, and FIG. 9 depicts the viewing of image data stored on device 50 using photo browser application 66, all in accordance with aspects of the present disclosure. As will be understood, the depicted screen images in FIGS. 7-9 may be generated by GUI 58 and displayed on display 28 of device 50. For instance, these screen images may be generated as the user interacts with the device 50, such as via input structures 14, or by a touch screen interface.

It should also be understood that GUI 58, depending on the inputs and selections made by a user, may display various screens including icons (e.g., 60) and graphical elements. These elements may represent graphical and virtual elements or "buttons" which may be selected by the user from display 28. Accordingly, it should be understood that the term "button," "virtual button," "graphical button," "graphical elements," or the like, as used in the following description of screen images below, is meant to refer to the graphical representations of buttons or icons represented by the graphical elements provided on display 28. Further, it should also be understood that the functionalities set forth and described in the subsequent figures may be achieved using a wide variety graphical elements and visual schemes. Therefore, the illustrated embodiments are not intended to be limited to the precise user interface conventions depicted herein. Rather, additional embodiments may include a wide variety of user interface styles.

As initially shown in FIG. 7, beginning from home screen 54 of GUI 58, the user may initiate the media player application by selecting graphical button 62. By way of example, media player application 62 may be an iPod® application running on a model of an iPod Touch® or an iPhone®, available from Apple Inc. Upon selection of graphical button 62, the user may be navigated to home screen 170 of media player application 62. As shown in FIG. 7, screen 170 may initially display listing 172 showing various playlists 174 stored on device 50. Screen 170 also includes graphical buttons 176, 178, 180, 182, and 184, each of which may correspond to specific functions. For example, if the user navigates away from screen 170, the selection of graphical button 176 may return the user to screen 170 and display playlists 174. Graphical button 178 may organize the media files stored on device 50 and display the media files in groupings based upon artist names, whereas graphical button 180 may represent a function by which media files are sorted and displayed alphabetically in a listing that may be navigated by the user. Additionally, graphical button 182 may present the user with a listing of video files available for playback on device 50. Finally, graphical button 182 may provide the user with a listing of additional options that the user may configure to further customize the functionality of device 50 and/or media player application 62.

As shown, the selection of graphical button 182 may advance the user to screen 186, which may display a listing of video files available for playback on device 50. By way of example, video files stored on device 50 may include music videos, captured videos (e.g., using camera 74), or movies. In some embodiments, video files may be downloaded from an online digital media service, such as iTunes®. As illustrated in screen 186, video file 188 is stored on device 50 and may be played by selecting graphical button 190. For instance, upon selection of graphical button 190, video file 188 may be played back on screen 192, which may sequentially display video images 194 corresponding to video file 188.

FIG. 8 shows screen images depicting the live capture of image data using camera 74. Returning to home screen 54, a user may initiate a camera application by selecting graphical button 64. The initiation of camera application 64 may activate image sensors within camera 74 for acquisition of image data, as well as ISP 114 for processing the image data captured via the image sensors. As shown, selection of camera application icon 64 may cause screen 198 to be displayed on device 50. Screen 198 may include viewfinder 200, which may display image data captured by camera 74 in substantially real time. For instance, if the user wishes to capture an image of subject (or object) 202, the user may position device 50 in such a manner that an image of subject 202 appears in viewfinder 200. Screen 198 also includes graphical button 204, which may be selected to store the captured images shown in viewfinder 200. The stored image data, referred to here by reference number 206, may include still images, such as pictures, as well as moving images, such as video. The stored image data 206 may be viewed or played back on device 50 at a later time, as generally described above.

FIG. 9 shows screen images depicting how a user may view images stored on device 50 using a photo browser application. For instance, beginning at home screen 54, a user may select icon 66 to run a photo browser application. By way of example, photo browser application 66 may be a version of iPhoto®, available from Apple Inc., or a mobile photo browser application, which may be found on models of the iPod® Touch or the iPhone®, also available from Apple Inc. As shown in FIG. 9, the selection of icon 66 may advance the user to home screen 210 of photo browser application 66. Screen 210 may display a listing 212 of "albums" or groupings of images stored on device 50. By selecting album 214, the user may be advanced to screen 216, on which image 206 (showing subject 202) that was previously acquired (e.g., by using camera application 64 of FIG. 8) is displayed. In embodiments where an album includes multiple images, the multiple images may be sequentially displayed in the form of a slideshow. Screen 216 also includes graphical button 218, which the user may select to return to listing 212 on screen 210.

Having described several techniques in FIGS. 7-9 by which image data may be acquired, viewed, or played back on device 50, FIGS. 10-20 are intended to illustrate various examples of audio alteration effects that may be applied to images displayed on device 50 in response to various types of image data, motion data, and/or position data, in accordance with aspects of the present disclosure. Before continuing, it should be understood the present disclosure is not intended to be limited to the specific audio alteration examples described with reference to FIGS. 10-20. Rather, these examples are provided in order to provide a reader with a better understanding of the disclosed audio alteration techniques, which may, in additional embodiments, utilize a number of audio alteration effects not specifically discussed herein.

Figure 10:
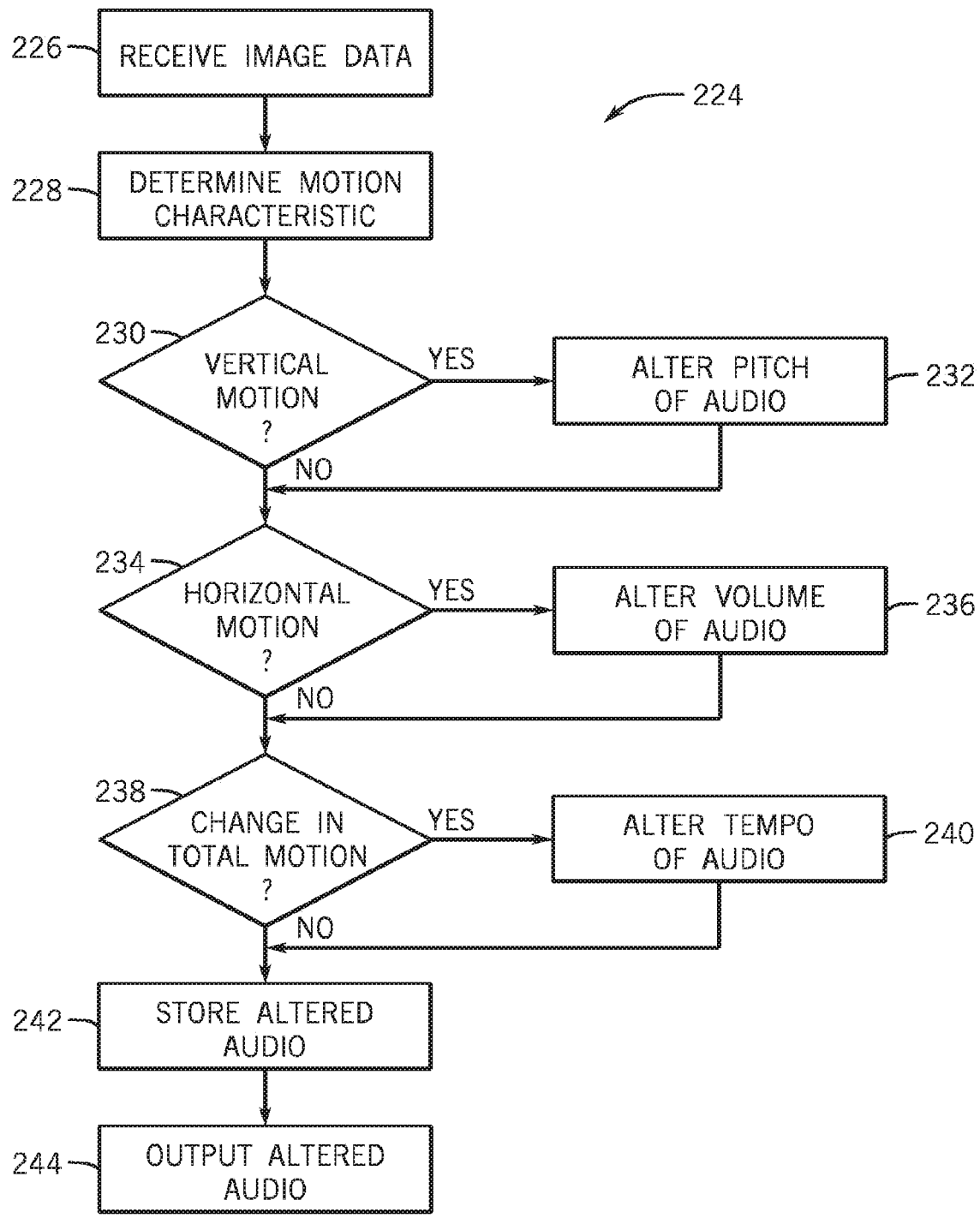
FIG. 10 is a flowchart representative of one embodiment in which audio is altered in response to one or more motion characteristics of received image data in accordance with aspects of the present disclosure.

For example, audio to be played back by electronic device 10 may be altered based on motion characteristics determined from image data in accordance with method 224, which is generally depicted in FIG. 10 in accordance with one embodiment. Particularly, in the presently illustrated embodiment, image data (e.g., video data) may be received at step 226 and motion characteristics may be determined from the image data in step 228. For example, encoder 124 may calculate motion vectors for one or more blocks of pixels in video frames of the received image data and may output such motion vectors to audio processing logic 32.

From these motion vectors, various audio effects may be applied to audio signals to be output from device 10. For instance, vertical motion in the received image data (decision block 230) may be used to vary the pitch of an audio output (or portion thereof) in step 232. In one embodiment, upward vertical motion may cause audio processing logic 32 to raise the pitch of the audio, while downward vertical motion may result in audio processing logic 32 lowering the pitch. As generally indicated by decision block 234, horizontal motion in the received image data may be used to control volume of the audio processed by audio processing logic 32 in step 236. For example, the volume of the audio may be increased in response to rightward motion in the received image data, and may be decreased in response to leftward motion in such image data.

Additionally, in one embodiment, a detected change in the total amount of motion in the received image data (decision block 238) may provide a basis for altering the tempo of the audio in step 240. For example, a relatively large amount of motion represented in the received image data may result in audio playback of music or some other audio at a quick tempo, while a relatively small amount of motion in the image data may correspondingly result in playback of the audio at a slow tempo. Further, the rate at which the tempo of the played back audio changes may be based on the corresponding rate of change in the total motion. Audio altered in the manner described above may be stored, output, or both in steps 242 and 244, respectively. Although the above example describes varying pitch based on vertical motion, varying volume based on horizontal motion, and varying tempo based on varying overall motion, it is noted that any number of audio characteristics other than those explicitly described with respect to FIG. 10 may also or instead be controlled based on motion characteristics based on the image data. For instance, in one embodiment, the manner in which audio alteration effects are applied may be controlled in accordance with user preferences 160.

Figure 11:
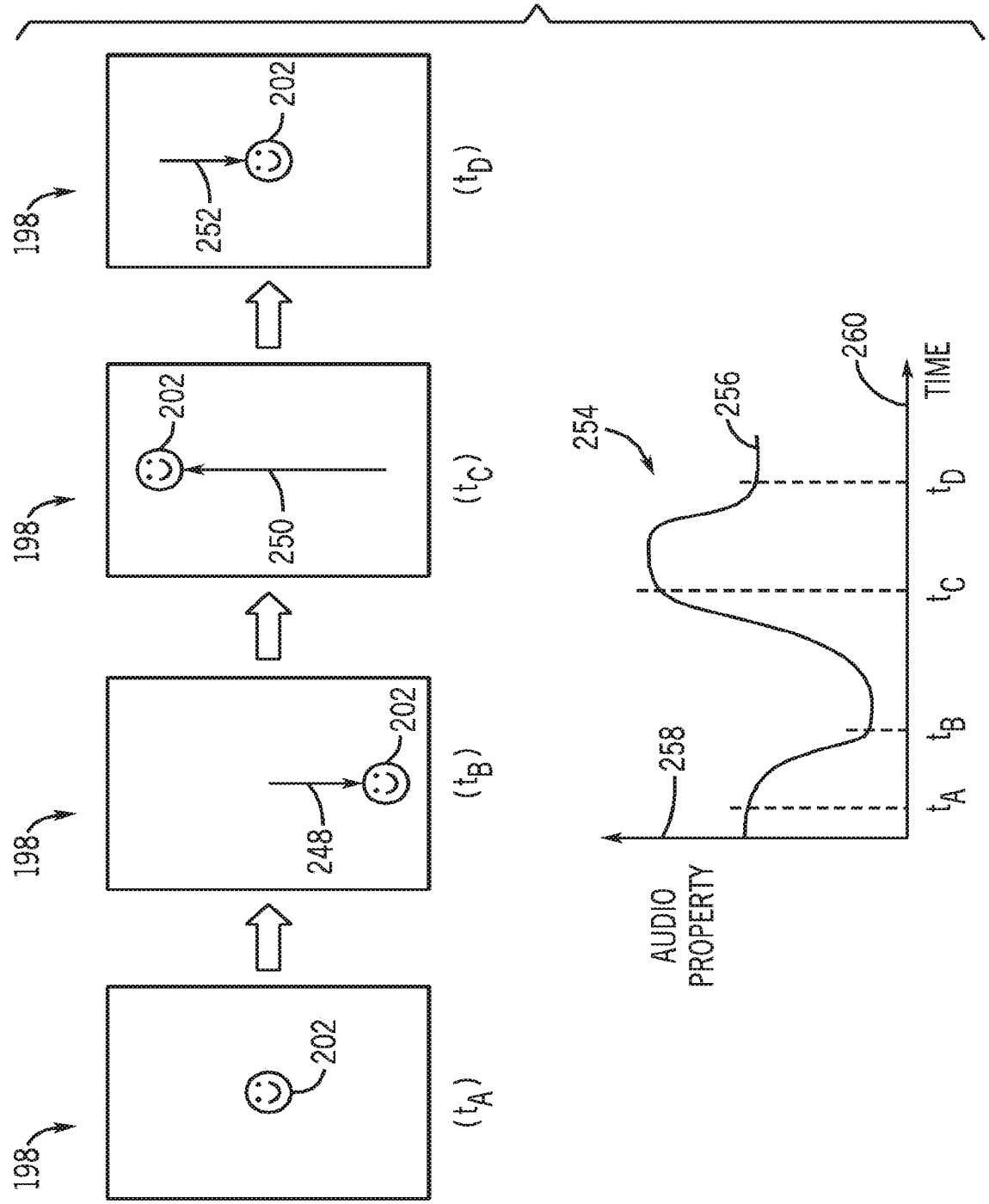
FIG. 11 illustrates the variation of an audio property, such as pitch, based on vertical motion in video data in accordance with aspects of the present disclosure.
Figure 12:
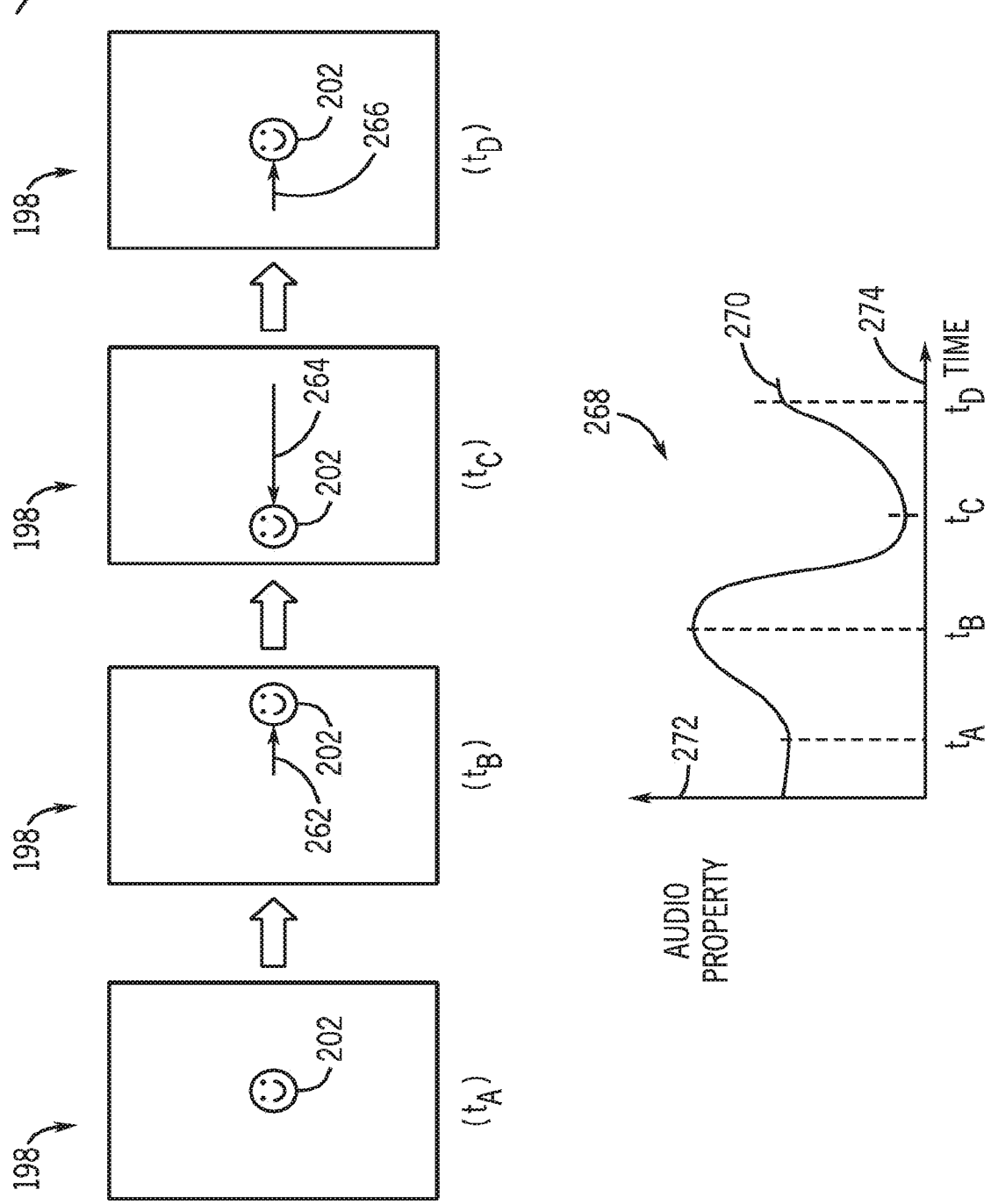
FIG. 12 illustrates the variation of an audio property, such as volume, based on horizontal motion in video data in accordance with aspects of the present disclosure.
Figure 13:
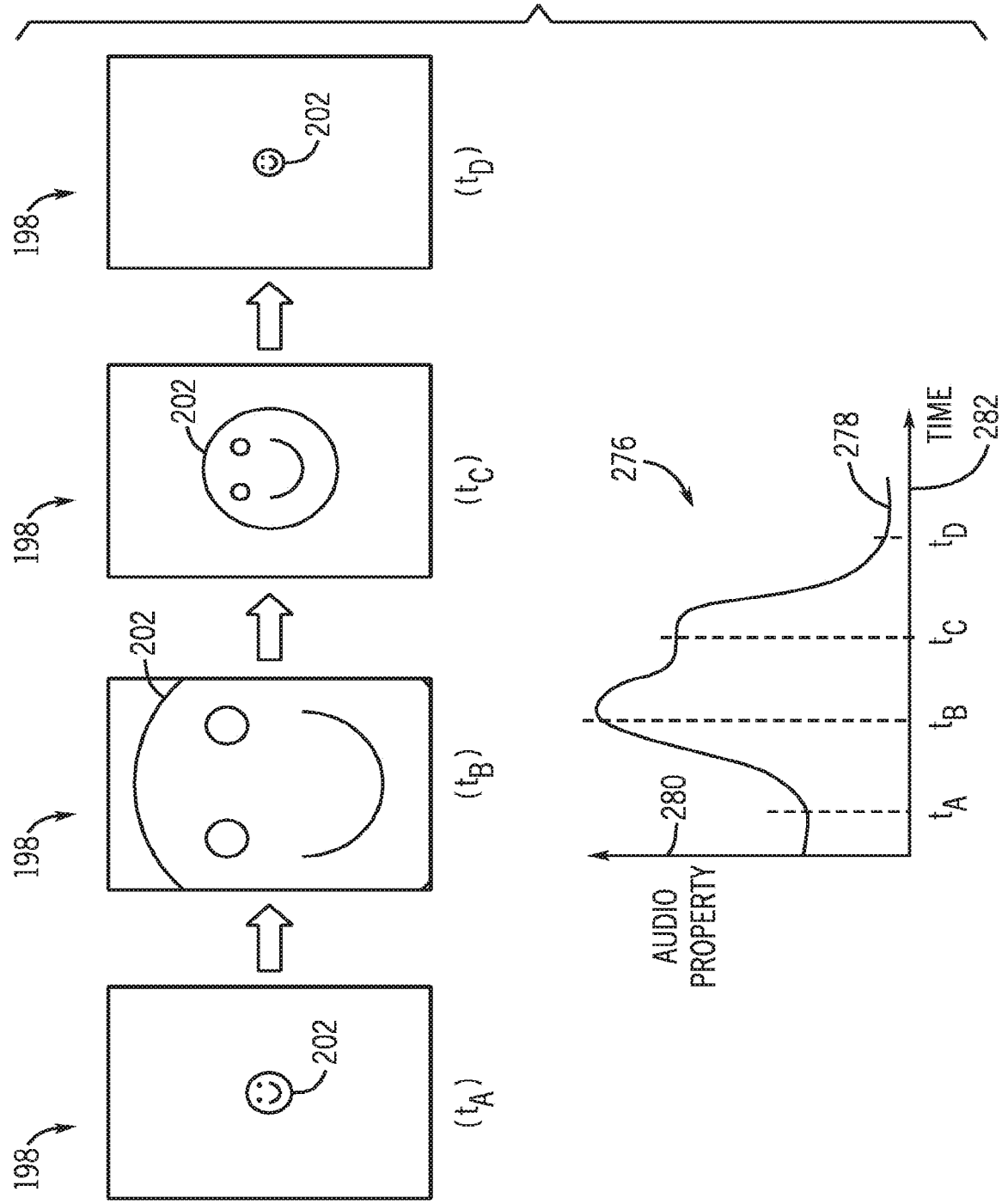
FIG. 13 illustrates the variation of an audio property based on zoom characteristics of video data in accordance with aspects of the present disclosure.
Figure 14:
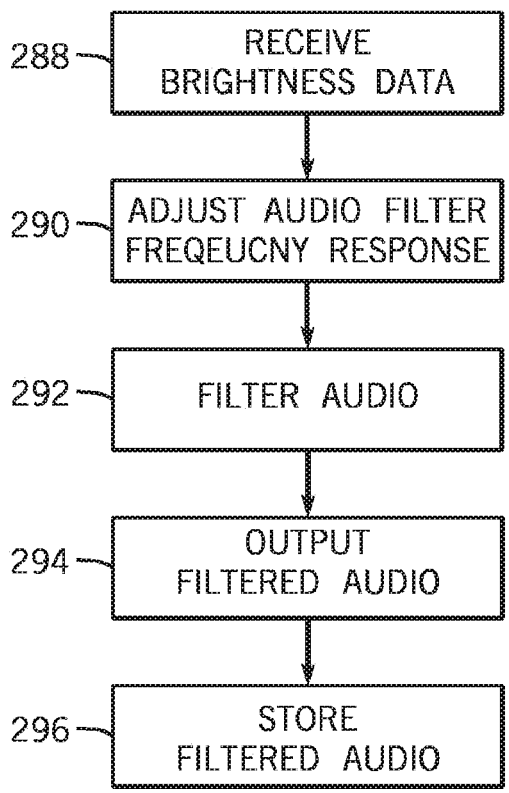
FIG. 14 is a flowchart generally depicting a method for altering audio based on image brightness data in accordance with aspects of the present disclosure.

Additional aspects of varying audio output based on motion in video data may be better understood with reference to FIGS. 11-13. Particularly, FIG. 11 generally depicts variation of an audio property in response to vertical motion in image data. A sequence of screens 198 is provided in FIG. 11 in accordance with one embodiment, in which object 202 undergoes vertical motion. The images depicted in the sequence of screens 198 may generally correspond to frames of a video image occurring at times $t_A$, $t_B$, $t_C$, and $t_D$ respectively.

For the present explanatory purposes, object 202 may be considered to be located in a central portion of screen 198 at time $t_A$. Object 202 may then move vertically downward, as represented by arrow 248, to a relatively low position in screen 198 at time $t_B$. Subsequently, object 202 may move upwardly (as represented by arrow 250) to a high position in screen 198 at time $t_C$, before returning (as represented by arrow 252) to the central position in screen 198 at time $t_D$.

A property of an audio signal may be varied in response to such vertical motion, as generally represented by graph 254. As noted above, the altered audio property may be a pitch characteristic of an audio signal. In other embodiments, however, the audio property may instead be related to tempo, filter sweep, equalization, volume, reverb, or the like. In the present illustration, curve 256 generally represents the varying magnitude of an audio property (represented along vertical axis 258) over a span of time (represented along horizontal axis 260). Particularly, the downward movement of object 202 from time $t_A$ to time $t_B$ may be represented in data received by audio processing logic 32 (e.g., motion vectors from encoder 124), and the audio property may be altered based on the downward motion. For example, pitch, volume, or the like may be reduced from time $t_A$ to time $t_B$, as generally depicted in graph 254. The upward motion of object 202 between times $t_B$ and $t_C$ may result in a corresponding increase in the audio property, as generally depicted in graph 254. Additionally, movement of the object 202 back to the central position in screen 198 at time $t_D$ may result in reduction in magnitude of the audio property between times $t_C$ and $t_D$, as also provided in graph 254.

Similarly, audio processing logic 32 may also alter one or more audio properties based on horizontal motion in the received image data. For instance, horizontal motion of object 202 between different times $t_A$, $t_B$, $t_C$, and $t_D$ may be detected by encoder 124 (e.g., through calculation of motion vectors), and one or more audio properties may be correspondingly adjusted based on such horizontal motion. As generally depicted in screens 198, object 202 may first move to the right of a field of view, then to the left of a field of view, and then back to the center of the field of view, as generally represented by arrows 262, 264, and 266, respectively. Additionally, as generally depicted by curve 270 in graph 268, the magnitude or some other aspect of the audio property (generally represented along vertical axis 272) may be varied over a time span (generally depicted along horizontal axis 274). For instance, the volume (or any other desired audio parameter) of an audio signal may be increased when object 202 moves toward the right and may be decreased when object 202 moves to the left.

As a further example, one or more characteristics of an audio signal to be output by device 50 may be varied based on any number of additional image characteristics. For example, as generally depicted in FIG. 13, an audio property may be altered by audio processing logic 32 in response to zooming into and away from object 202 in the received video data. For example, received video data may include a zoom-in effect between times $t_A$ and $t_B$, and may include zoom-out effects between times $t_B$ and $t_C$, as well as times $t_C$ and $t_D$. As represented by curve 278 in graph 276, which generally represents variation of an audio property over time (corresponding to axes 280 and 282, respectively), an audio property (e.g., pitch, volume, frequency response) may generally increase as the video data zooms-in on object 202, and may generally decrease as the video data zooms-out from object 202. Of course, in other embodiments, the effect applied by audio processing logic 32 based on such zooming may be reversed, such that zooming-in results in a decrease in the magnitude or other aspect of an audio property, while zooming-out results in an increase in the magnitude or other aspect of the audio property. In one embodiment, the audio effect applied may include a Doppler effect, in which an audio pitch rises as the video zooms-in on object 202, and falls as the video zooms-out from object 202.

The alteration of audio output by device 50 may be based on a variety of other image characteristics, as generally noted above. For instance, method 286, generally depicted in FIG. 14 in accordance with one embodiment, may include step 288 of receiving brightness data of received image data. As noted above, such brightness data may be provided via ISP 114 based on one or more still images or video images. Method 286 may further include adjusting the frequency response of an audio filter (or some other audio property) in step 290 based on such brightness data, and applying the audio filter (or other audio effect) to an audio signal in step 292.

For example, with respect to video data, a decrease in the brightness of video data may be used as a basis for reducing the frequency response of an audio filter to darken the timbre of audio to be output to a user. In contrast, an increase in the brightness of video data may result in the widening of the frequency response of the audio filter, thereby increasing the brightness of the timbre of the audio to be output. Similarly, for still image data, the frequency response of such an audio filter applied by audio processing logic 32 may be varied based on the relative brightness of the still images. Additionally, if the image data includes a low brightness level, the audio filter may be used to generally muffle the audio (e.g., via an audio filter), while a relatively high brightness level may result in the audio not being muffled by audio processing logic 32, which may result in a clearer, more centered, sound to the audio. The audio may be output in step 294, with or without the images on which the audio alteration effects are based. The altered audio may also or instead be stored in a suitable medium in step 296 for future output.

Figure 15:
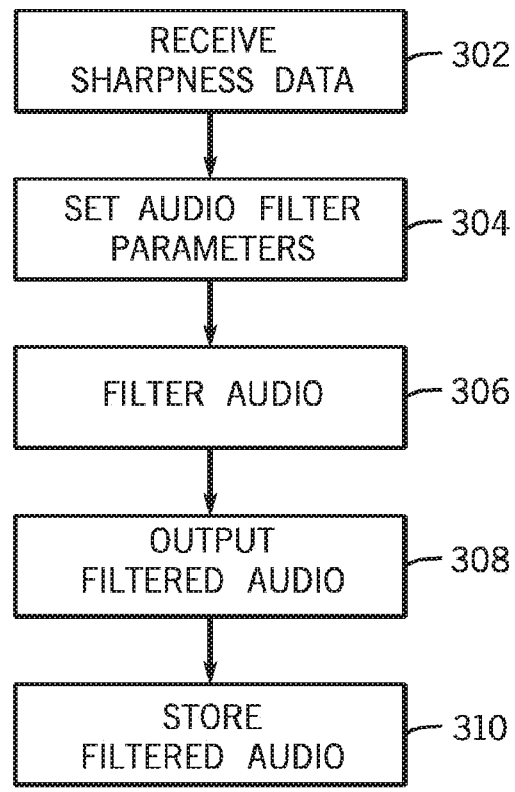
FIG. 15 is a flowchart generally depicting a method for altering audio based on image sharpness data in accordance with aspects of the present disclosure.

Moreover, audio processing logic 32 may also apply various audio effects to an audio signal based on sharpness data, as generally provided by method 300, which is depicted in FIG. 15 in accordance with one embodiment. Method 300 includes receiving sharpness data, such as from ISP 114, in step 302. Parameters of an audio filter may be set by (or a particular filter may be selected by) audio processing logic 32, in step 304, based on the received sharpness data, and audio may filtered by audio processing logic 32 in step 306. For instance, in one embodiment, audio processing logic 32 may apply a distortion filter to muffle the audio or narrow its frequency or dynamic range if the image data is out of focus, and may increase the frequency or dynamic range of the audio if the received image data is in focus (or as the image comes into focus). Of course, as generally noted previously, the aforementioned brightness data and sharpness data may be used to apply any number of audio effects in place of or in addition to those described above. The altered audio may be output (with or without image data) and/or stored in steps 308 and 310, respectively.

Figure 16:
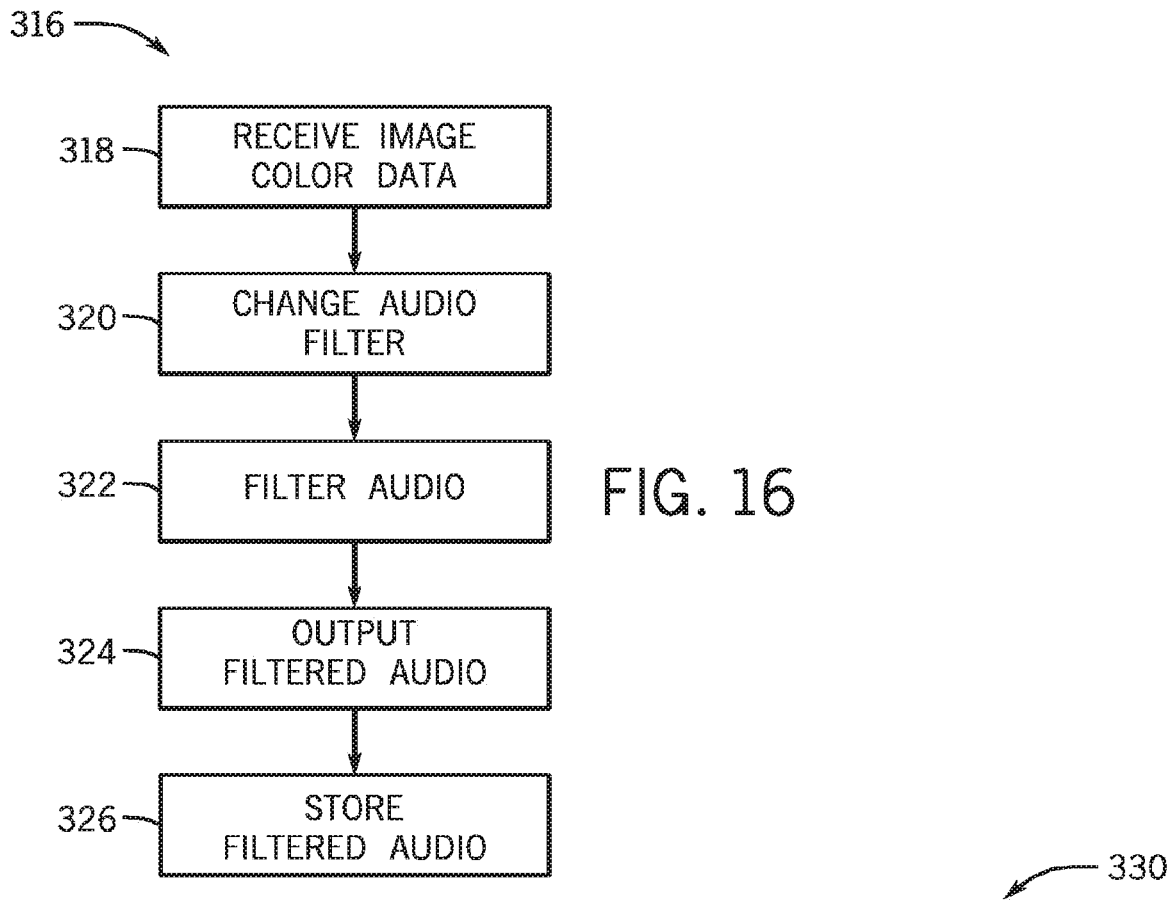
FIG. 16 is a flowchart generally depicting a method for altering audio based on image color data in accordance with aspects of the present disclosure.

In an additional embodiment, audio may be filtered or otherwise altered based on image color statistics via method 316 generally depicted in FIG. 16. Method 316 may include receiving image color statistics in step 318 (e.g., via ISP 114), and changing parameters of (or selecting) an audio filter in step 320 based on the image color statistics. For example, the frequency response of a filter may be modified based on the image color statistics. By way of further example, in one embodiment, the frequency response to an audio filter may be widened if the image color statistics indicate that the colors of an image are predominately light, and the frequency range of the filter may be narrowed if the image color statistics indicate the predominance of darker colors. As a result, in such an embodiment audio filtered in step 322 via the filter may have a brighter or a darker timbre corresponding to the lighter or darker colors indicated by the image color statistics. The filtered audio may then be output and/or stored in steps 324 and 326, respectively. Of course, any number of other audio characteristics may be altered by the audio processing logic 32 based on color data for images.

Figure 17:
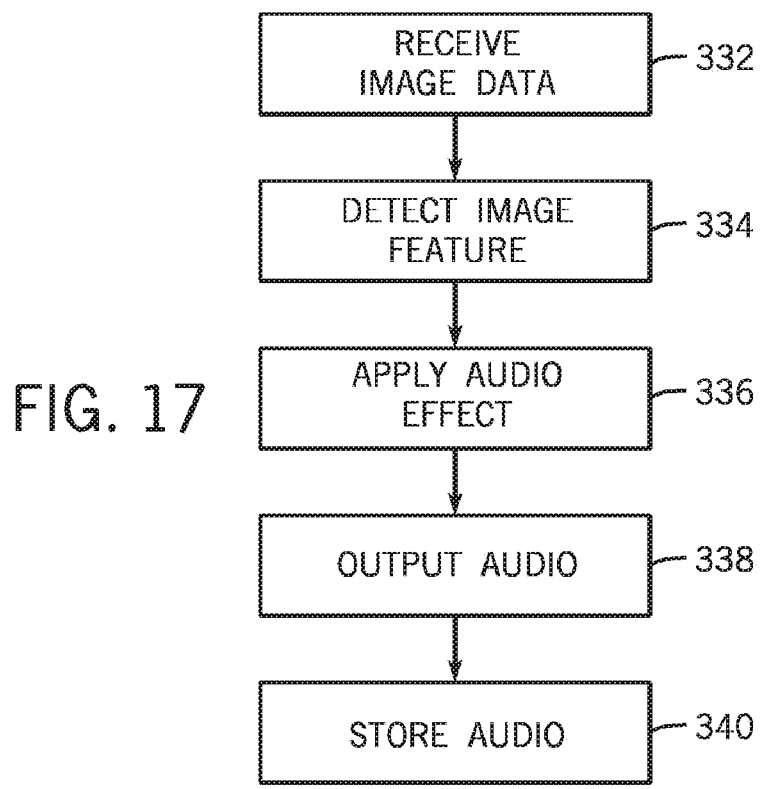
FIG. 17 is a flowchart generally depicting a method for altering audio based on detection of a feature of interest in image data, in accordance with aspects of the present disclosure.

In yet another embodiment, an audio effect may be applied to an audio signal based on one or more features of image data via method 330 generally depicted FIG. 17. Method 330 may include receiving image data in step 332, and detecting one or more image features or characteristics in step 334. For example, in one embodiment, the received image data may be analyzed to determine the presence of water in the image data, and an "underwater" audio effect may be applied to the audio signal in step 336. The audio effect may include a generated gurgling sound similar to that produced by bubbles in water, may include a distortion filter that alters an underlying audio signal to sound as if it were passing through water, or may include some other feature. The analysis of image data may include an analysis of the images themselves, of metadata associated with the images, or both. Indeed, metadata associated with various images may provide the basis for altering audio in accordance with some embodiments of the present techniques. The altered audio may be output (with or without images) and stored in steps 338 and 340, respectively.

Figure 18:
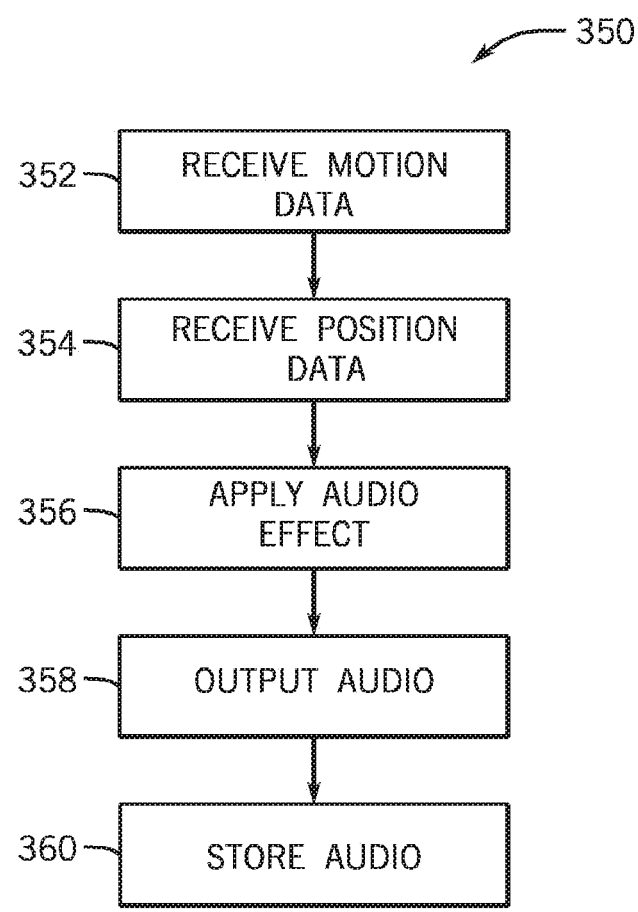
FIG. 18 is a flowchart generally depicting a method for altering audio based on one or both of motion data or position data in accordance with aspects of the present disclosure.

In addition to altering audio playback characteristics based on image data, audio effects may also be generated based on other trigging events or data, such as motion data from motion sensing device 36 and position data (e.g., from GPS device 38). For example, method 350 is generally depicted in FIG. 18 in accordance with one embodiment. Method 350 includes receiving motion data in step 352, receiving position data in step 354, or both. An audio effect is applied (i.e., applied to existing audio and/or generated) to alter audio output based on the received data in step 356. While various examples of such audio effects are provided and described below with respect FIGS. 19 and 20, it will be appreciated that other audio effects may be applied based on the received motion and position data. Further, such altered audio may be output and/or stored in steps in 358 and 360, respectively.

Figure 19:
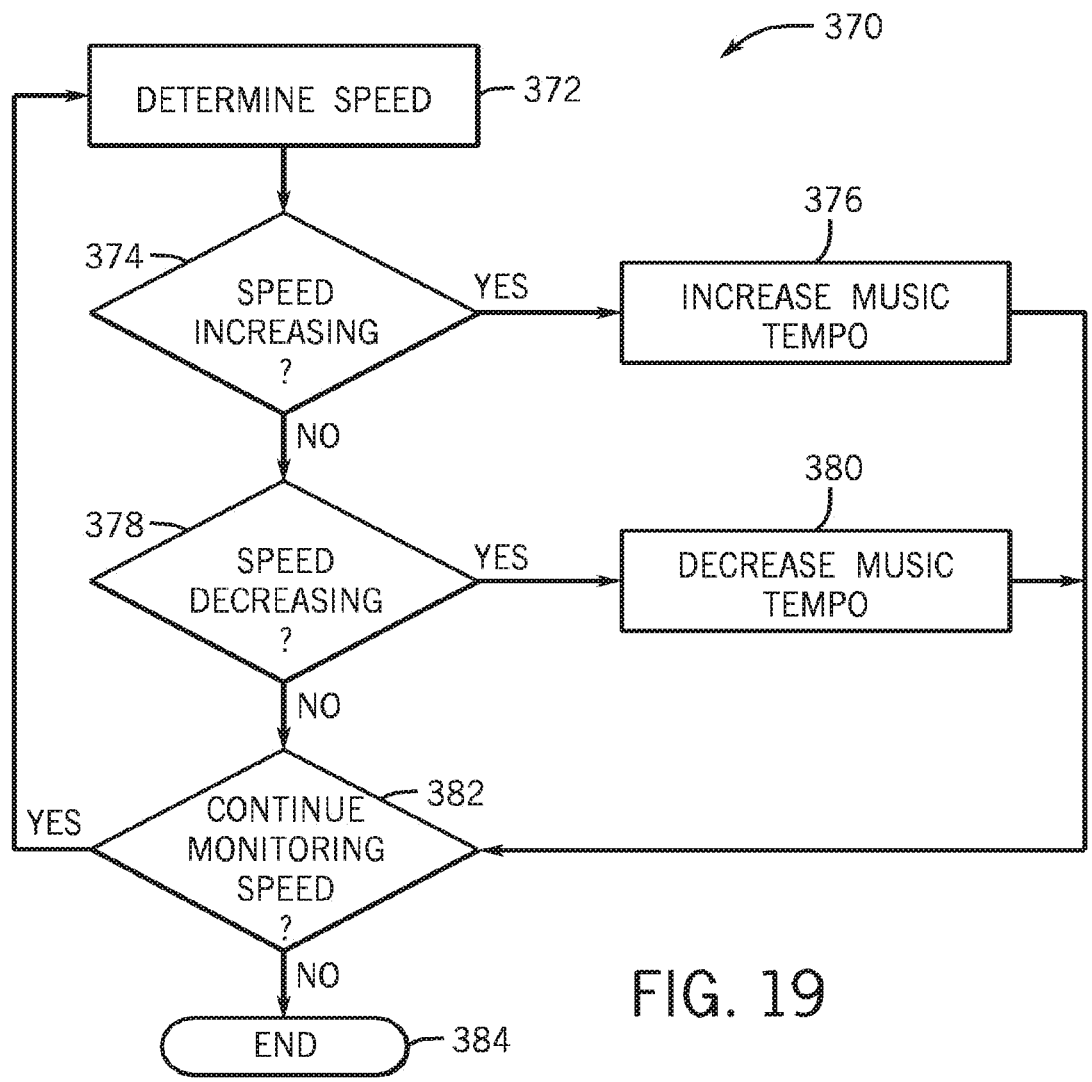
FIG. 19 is a flowchart generally depicting a method for altering audio based on a determined speed characteristic in accordance with aspects of the present disclosure.

By way of further example, FIG. 19 generally depicts method 370 for altering an audio parameter based on motion or position data in accordance with one embodiment. In step 372, a speed parameter may be determined from the motion data or the position data. The speed parameter may relate to any of various speeds associated with device 50, such as a translational speed, a rotational speed, or the like. If it is determined that the speed is increasing (decision block 374), the tempo at which music (or other audio) is output by device 50 may be increased in step 376. Conversely, if it is determined that the speed is decreasing (decision block 378), the tempo of music being played back by device 50 may be decreased in step 380. The speed may be iteratively monitored (decision block 382) to continuously vary the tempo of the music before concluding at step 384. In one embodiment the speed on which the variation in music tempo is based may be a rotational speed of the device 50. For example, device 50 may be placed upon a surface, and a user may spin device 50 at different rates to control the rate of music playback.

Figure 20:
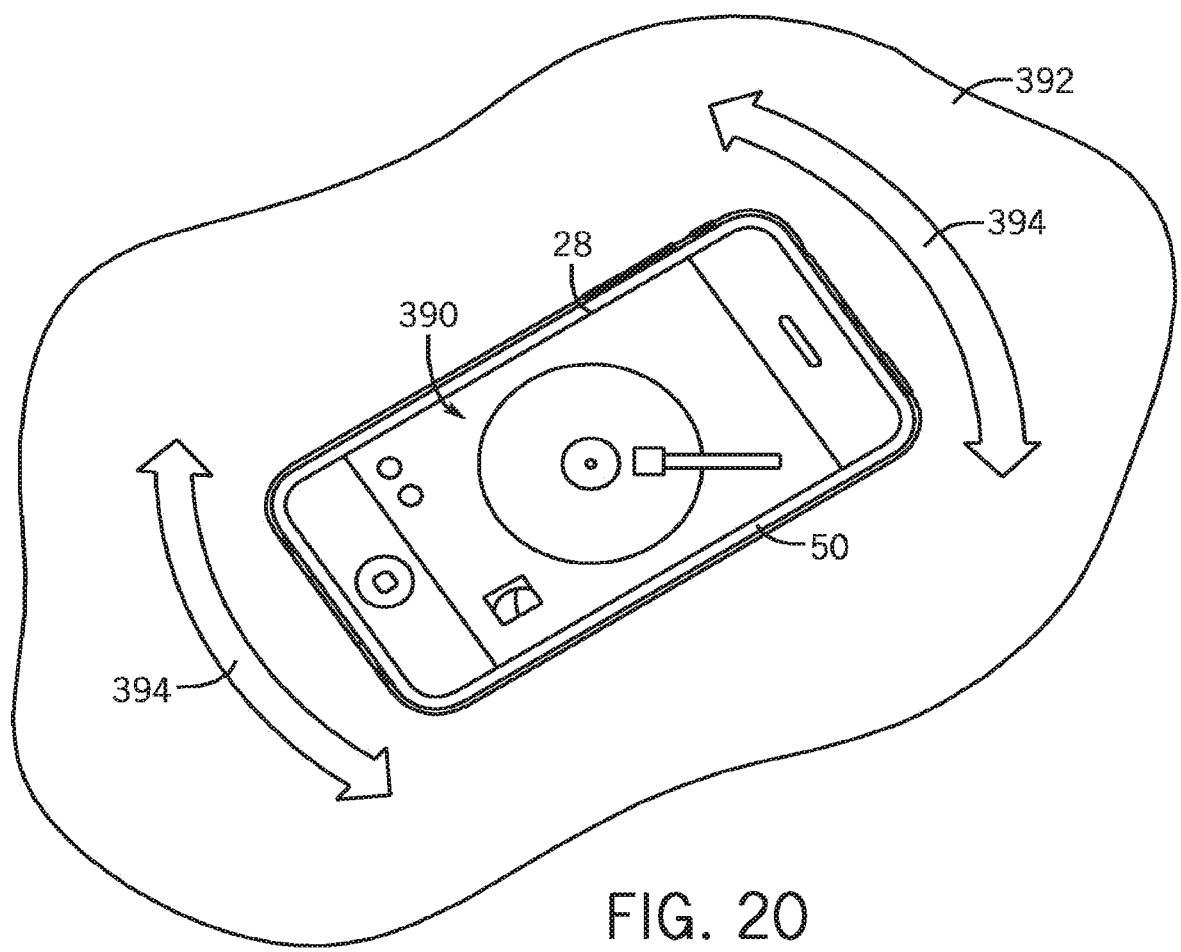
FIG. 20 is a top view of the device of FIG. 2, generally depicting rotation of the device to effect audio alteration in accordance with aspects of the present disclosure.

For instance, as generally depicted in FIG. 20 in accordance with one embodiment, device 50 may execute a virtual record player application. In such an embodiment, virtual record player 390 may be displayed via display 28, and one or more features of audio output may be controlled via rotation or spinning of the device 50 on surface 392 (or independent of surface 392 in another embodiment). For example, in one embodiment, device 50 may be rotated clockwise to increase the speed of music playback, or may be rotated counter-clockwise to reduce the speed of music playback (such rotation is generally represented by arrows 394). In another embodiment, the virtual record player application may provide a virtual "scratch" record, allowing a user to rotate device 50 back and forth to cause the device 50 to output a record scratching effect similar to that a disc jockey may obtain with a vinyl record on a turntable.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
   receiving, at an electronic device, a plurality of video data frames representing an object;
   receiving, at the electronic device, an audio signal associated with the plurality of video data frames, the audio signal including audio properties;
   processing, by the electronic device, the video data frames by encoding the video data frames via a video encoder of the electronic device to identify a direction of movement of at least a portion of the object; and
   altering, by the electronic device, the audio signal associated with the plurality of video data frames by adjusting the audio properties of the audio signal based at least in part on the direction of movement of the at least a portion of the object.

2. The method of claim 1, wherein the object comprises at least a portion of a user in view of a camera of the electronic device.

3. The method of claim 2, wherein the plurality of video data frames are captured by the camera of the electronic device.

4. The method of claim 1, wherein the encoding data includes a motion vector calculated by the video encoder.

5. The method of claim 1, wherein the audio signal further includes a third audio property that varies based on a total amount of motion in the received plurality of video data frames.

6. The method of claim 1, wherein at least one of the audio properties is configured to vary based at least in part on a total amount of motion in the received plurality of video data frames.

7. The method of claim 1, wherein adjusting the audio properties of the audio signal includes varying at least one of a volume, a pitch, or a tempo of the audio signal.

8. The method of claim 1, further comprising outputting the altered audio signal from the electronic device, wherein outputting the altered audio signal includes at least one of playing the altered audio signal to a user via a speaker or outputting electronic data encoding the altered audio signal to an additional electronic device.

9. The method of claim 1, further comprising outputting video generated from the plurality of video data frames to a user via a display of the electronic device.

10. An electronic device, comprising:
    a camera;
    a microphone; and
    one or more processors in communication with the camera and the microphone, the one or more processors configured to:
    receive, from the camera, a plurality of video data frames representing an object;
    receive, from the microphone, an audio signal associated with the plurality of video data frames, the audio signal including audio properties;
    process the video data frames by encoding the video data frames via a video encoder of the electronic device to identify a direction of movement of at least a portion of the object; and alter the audio signal associated with the plurality of video data frames by adjusting the audio properties of the audio signal based at least in part on the direction of movement of the at least a portion of the object.

11. The electronic device of claim 10, wherein the object comprises at least a face of a user in view of the camera of the electronic device.

12. The electronic device of claim 10, wherein the audio signal further includes a third audio property that varies based on a total amount of motion in the received plurality of video data frames.

13. The electronic device of claim 10, wherein at least one of the audio properties is configured to vary based at least in part on a total amount of motion in the received plurality of video data frames.

14. The electronic device of claim 10, wherein adjusting the audio properties of the audio signal includes varying at least one of a volume, a pitch, or a tempo of the audio signal.

15. The electronic device of claim 10, wherein the one or more processors are further configured to output the altered audio signal and a video generated from the plurality of video data frames via a display of the electronic device.

16. A computer-readable storage medium storing computer-executable instructions that, when executed by one or more processors of an electronic device, configure the one or more processors to perform operations comprising:
  receiving a plurality of video data frames representing an object;
  receiving an audio signal associated with the plurality of video data frames, the audio signal including audio properties;
  processing the video data frames by encoding the video data frames via a video encoder of the electronic device to identify a direction of movement of at least a portion of the object; and
  altering the audio signal associated with the plurality of video data frames by adjusting the audio properties of the audio signal based at least in part on the direction of movement of the at least a portion of the object.

17. The computer-readable storage medium of claim 16, wherein the object comprises at least a face of a user in view of a camera of the electronic device.

18. The computer-readable storage medium of claim 17, wherein the plurality of video data frames are captured by the camera of the electronic device.

19. The computer-readable storage medium of claim 16, wherein adjusting the audio properties of the audio signal includes varying at least one of a volume, a pitch, or a tempo of the audio signal.

20. The computer-readable storage medium of claim 16, wherein the one or more processors are further configured to perform the operations comprising outputing the altered audio signal and a video generated from the plurality of video data frames via a display of the electronic device.

* * * * *